(12) United States Patent
Nakazato

(10) Patent No.: US 7,212,299 B2
(45) Date of Patent: *May 1, 2007

(54) PRINTING SYSTEM HAVING A PLURALITY OF PRINTER DRIVERS FOR DIFFERENT EMULATIONS

(75) Inventor: Hirohiko Nakazato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 25 days.

This patent is subject to a terminal disclaimer.

(21) Appl. No.: 11/123,815

(22) Filed: May 6, 2005

(65) Prior Publication Data

US 2005/0200878 A1 Sep. 15, 2005

Related U.S. Application Data

(63) Continuation of application No. 09/527,516, filed on Mar. 16, 2000, now Pat. No. 6,891,631.

(30) Foreign Application Priority Data

Mar. 17, 1999 (JP) .................................. 11-071144

(51) Int. Cl.
*G06F 3/12* (2006.01)
*G06K 15/00* (2006.01)

(52) U.S. Cl. .................... 358/1.13; 358/1.15; 358/1.14
(58) Field of Classification Search ......... 358/1.1–1.18
See application file for complete search history.

(56) References Cited

U.S. PATENT DOCUMENTS

| 5,228,118 A | 7/1993 | Sasaki |
| 5,960,166 A | 9/1999 | Brown, III et al. |
| 6,042,278 A | 3/2000 | Spencer et al. |
| 6,216,176 B1 | 4/2001 | Kadota |
| 6,567,175 B1 | 5/2003 | Lee |

FOREIGN PATENT DOCUMENTS

JP 7-162722 6/1995

*Primary Examiner*—Douglas Q. Tran
(74) *Attorney, Agent, or Firm*—Akin Gump Strauss Hauer & Feld, LLP

(57) ABSTRACT

A printing system includes a computer and a printer. The computer includes a plurality of printer drivers provided for different kinds of emulations, respectively. The computer compares environments of the computer and the printer and selects one of the printer drivers according to a result of the comparison. Thus, the optimum printer driver can be automatically selected for printing by the printer.

18 Claims, 18 Drawing Sheets

Fig. 11

| | CATEGORY | OUTLINE | DRAWING FUNCTION TO BE EVALUATED | OUTLINE |
|---|---|---|---|---|
| (1) | CURVECAPS | CURVE DRAWING CAPABILITY | CC-CIRCLES | DRAWING OF CIRCLE |
| (2) | LINECAPS | LINE DRAWING CAPABILITY | LC - POLYSCANLINE | GROUP DRAWING OF SCANLINE |
| (3) | LINECAPS | LINE DRAWING CAPABILITY | LC - STYLED | DRAWING OF STYLED LINE |
| (4) | POLYGONCAPS | POLYGON DRAWING CAPABILITY | PC - RECTANGLE | DRAWING OF RECTANGLE |
| (5) | POLYGONCAPS | POLYGON DRAWING CAPABILITY | PC - WINDPOLYGON | WHOLE-AREA PAINT-OUT OF POLYGON |
| (6) | TEXTCAPS | TEXT DRAWING CAPABILITY | TC - RA - ABLE | RASTER FONT |
| (7) | TEXTCAPS | TEXT DRAWING CAPABILITY | TC - CR - 90 | CHARACTER ROTATION BY 90 DEGREES |
| (8) | CLIPCAPS | CLIPPING CAPABILITY | CP - RECTANGLE | CLIPPING OF RECTANGLE |
| (9) | RASTERCAPS | RASTER CAPABILITY | RC - BITBLT | BIT-MAP TRANSFER |
| (10) | RASTERCAPS | RASTER CAPABILITY | RC - STRETCHDIB | STRETCHING/CONTRACTION OF DIB(BIT MAP) |

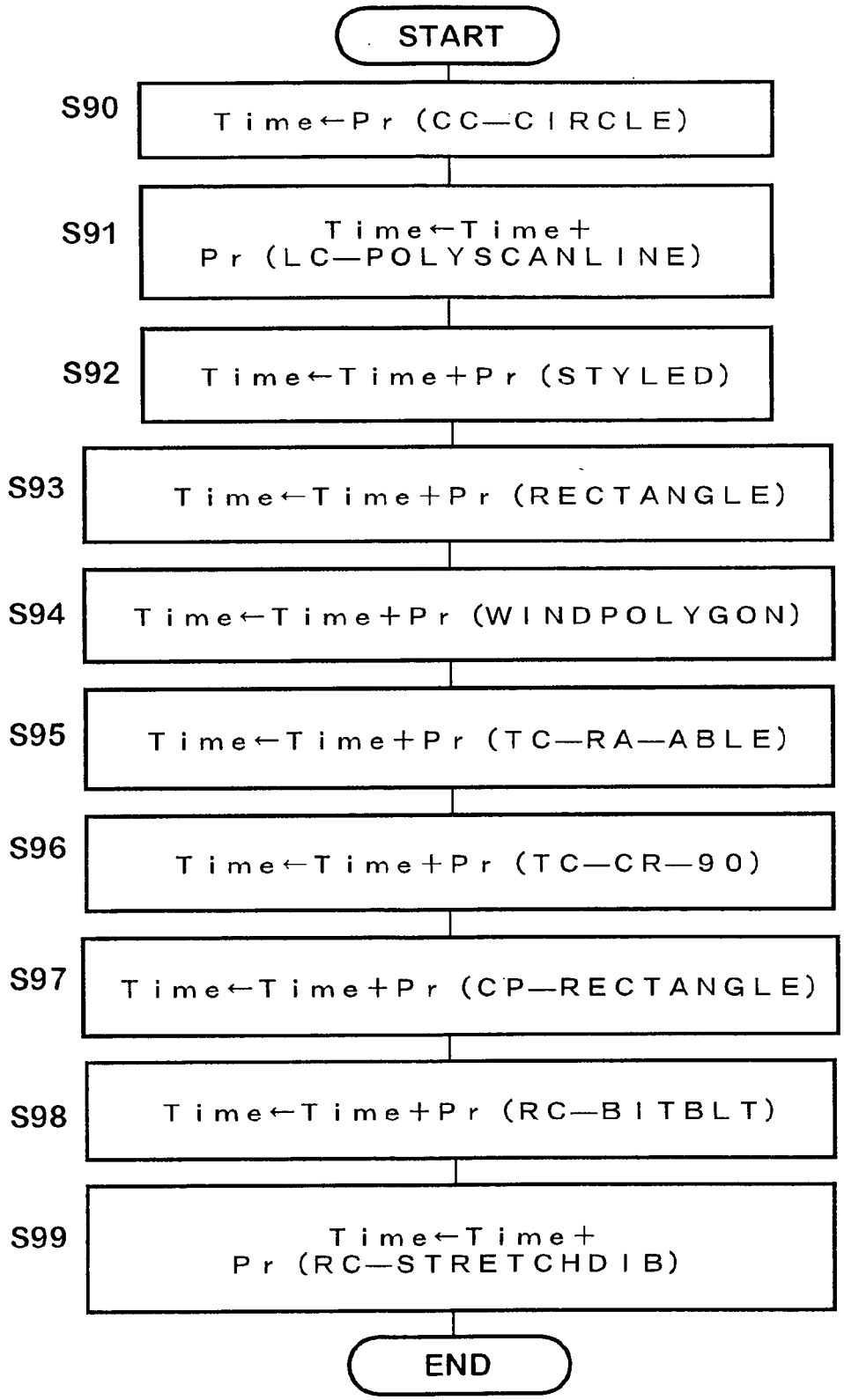

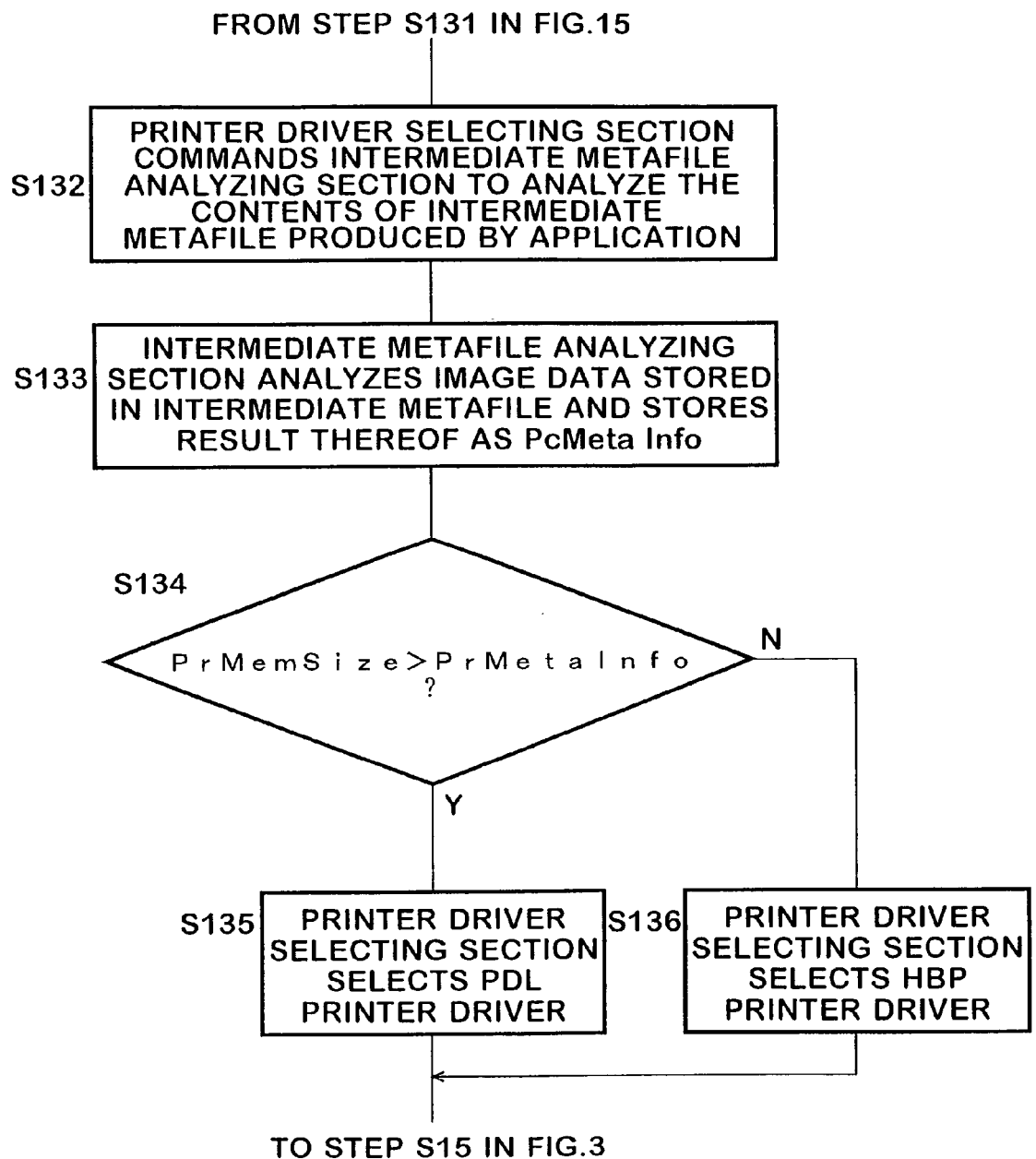

Fig. 17

| | PDL COMMAND (2 BYTES) | ATTRIBUTE INFORMATION AMOUNT | EVALUATION SIZE | COMMAND OUTLINE | ATTRIBUTE INFORMATION OUTLINE |
|---|---|---|---|---|---|
| (1) | TEXT | | 52 BYTES | TEXT | OUTLINE FONT |
| (2) | LINE | 12 BYTES | 14 BYTES | LINE | START/END POINT COORDINATES, LINE KIND INFORMATION |
| (3) | CIRCLE | 12 BYTES | 14 BYTES | CIRCLE | LEFT-UPPER/RIGHT-LOWER END COORDINATES, CIRCLE KIND INFORMATION |
| (4) | CURVE | 16 BYTES | 18 BYTES | CURVE | |
| (5) | PIXEL | 4 BYTES | 6 BYTES | PIXEL | COORDINATES |
| (6) | IMAGE | IMAGE DATA | 40 KBYTES | BIT MAP | X-DIRECTION SIZE, Y-DIRECTION SIZE |
| (7) | DUMMY | 38 BYTES | 40 BYTES | OTHER THAN (1) TO (6) | |

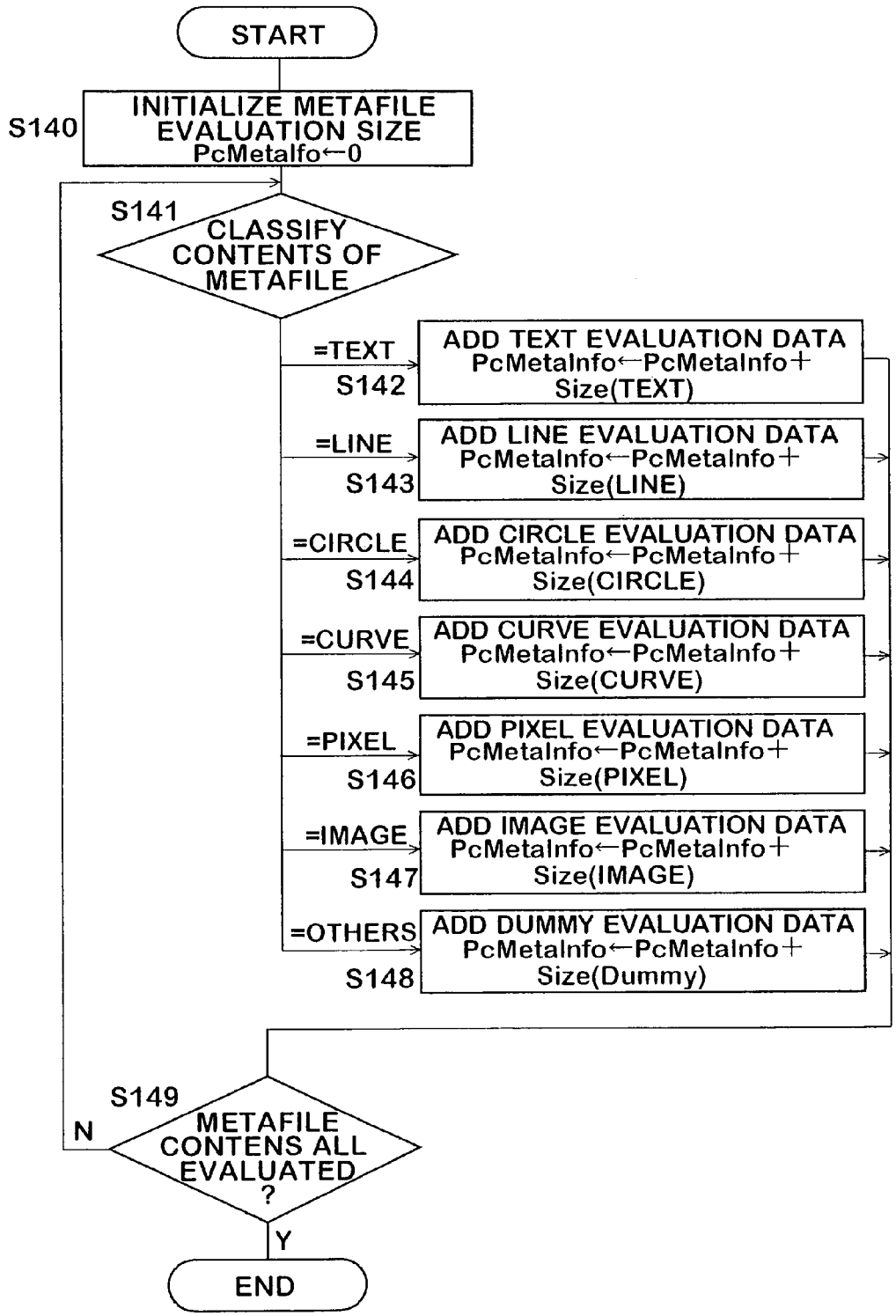

PRINTING SYSTEM HAVING A PLURALITY OF PRINTER DRIVERS FOR DIFFERENT EMULATIONS

CROSS-REFERENCE TO RELATED APPLICATIONS

This application is a continuation of U.S. application Ser. No. 09/527,516 filed Mar. 16, 2000, now U.S. Pat. No. 6,891,631, the entire disclosure of which is incorporated herein by reference.

BACKGROUND OF THE INVENTION

1. Field of the Invention

The present invention relates to a printing system wherein image data for printing is sent from a computer to a printer so that the printer performs printing based on the image data received from the computer.

2. Description of the Related Art

For controlling an operation of a printer, a computer stores a printer driver which is executed on an operating system of the computer. The printer driver is software for converting image data produced by an application executed on the operating system of the computer into a printer language. There have been available printer drivers for a page description language (PDL) emulation and a host base printer (HBP) emulation. For the PDL emulation, bit-mapping of image data is carried out in a printer. On the other hand, for the HBP emulation, bit-mapping of image data is carried out in a computer.

The printer driver for the PDL emulation converts image data from the application into a page description language and sends the converted image data and command sets to the printer. In response, a controller of the printer converts the received image data into an intermediate data format of a display list, and then converts it into bit-mapped image data matching with the print resolution of the printer.

In the PDL emulation, the printer starts printing after receipt of one-page image data. Accordingly, a processing load of the printer driver itself is small for the PDL emulation. Further, the data transfer amount from the computer to the printer is small as compared with the HBP emulation so that the high data transfer rate is not required. On the other hand, the data processing capability required to the controller of the printer is high.

The printer driver for the HBP emulation converts image data into bit-mapped image data matching with the print resolution of the printer, and then compresses the bit-mapped image data for sending to the printer. In response, the printer expands the compressed bit-mapped image data for printing.

In the HBP emulation, the printer starts printing before finishing receipt of one-page image data. Specifically, the printing is implemented in parallel with receiving the image data. Accordingly, a processing load of the printer driver is quite large for the HBP emulation. Further, the data transfer amount from the computer to the printer is large as compared with the PDL emulation so that the high data transfer rate is required to follow the printing speed of the printer.

The foregoing conventional techniques have the following problem.

Owing to the remarkable advancement in processing capability of personal computers and the reduction in price thereof, it becomes relatively easy to achieve a high throughput required for the HBP emulation. Under the circumstances, there have appeared multi-emulation printers which can support both the PDL emulation and the HBP emulation. For effectively utilizing these printers, it is necessary to properly select a printer driver depending on various printing conditions, i.e. environments of the computers and the printers.

For this purpose, JP-A-7-162722 discloses a technique wherein a computer receives a status signal from a printer and selects a printer driver based on information contained in the received status signal. However, the optimum printer driver changes depending on various printing conditions and thus it is practically difficult to select the optimum printer driver. Accordingly, more concrete and practical techniques for automatic printer driver selection have been demanded.

SUMMARY OF THE INVENTION

Therefore, it is an object of the present invention to provide an improved printing system that can solve the foregoing problem.

According to one aspect of the present invention, there is provided a printing system comprising a computer and a printer, wherein the computer includes a plurality of printer drivers provided for different emulations, respectively, the computer comparing an environment of the computer and an environment of the printer to select one of the printer drivers based on a result of the comparison, the computer processing image data by the selected one of the printer drivers and sending the processed image data to the printer, and wherein the printer receives the processed image data from the computer and processes the received image data according to one of the emulations corresponding to the selected one of the printer drivers to implement printing.

It may be arranged that the environments of the computer and the printer include a size of the image data, a free memory size of the computer for storing therein the image data, and a free memory size of the printer for storing therein the image data.

It may be arranged that the environments of the computer and the printer include a size of the image data, a free memory size of the printer for storing therein the image data, a data transfer speed from the computer to the printer, and a paper feed speed of the printer.

It may be arranged that the environments of the computer and the printer include a drawing speed of the computer upon drawing the image data, and a drawing speed of the printer upon drawing the image data.

It may be arranged that the environments of the computer and the printer include an evaluation size of an intermediate metafile of the image data in the computer, and a free memory size of the printer for storing therein the image data.

According to another aspect of the present invention, there is provided a printing system comprising a computer and a printer, the computer including a plurality of printer drivers provided for different emulations, respectively, the computer further including a computer environment determining section which determines an environment of the computer and a printer environment determining section which determines an environment of the printer based on information sent from the printer, the computer further including a printer driver selecting section which compares the environments of the computer and the printer to select one of the printer drivers based on a result of the comparison, so that image data is processed by the selected one of the printer drivers and sent to the printer, and the printer including a printer environment measuring section which measures an environment of the printer and notifies it as the information to the printer environment determining section of the computer, the printer further including an emulation judging section which judges one of the emulations corresponding to the selected one of the printer drivers, and an emulation section which processes the image data according to the judged one of the emulations for printing.

It may be arranged that the computer environment determining section comprises a computer free memory size determining section which determines a free memory size of the computer for storing therein the image data, and the printer environment determining section comprises a printer free memory size determining section which determines a free memory size of the printer based on the information sent from the printer, that the printer driver selecting section compares a size of the image data and the free memory sizes of the computer and the printer to select one of the printer drivers based on the result of the comparison, and that the printer environment measuring section comprises a printer free memory size measuring section which measures a free memory size of the printer for storing therein the image data and notifies it as the information to the printer free memory size determining section of the computer.

It may be arranged that the computer environment determining section comprises a computer data transfer speed determining section which determines a data transfer speed when the image data is transferred from the computer to the printer, and the printer environment determining section comprises a printer free memory size determining section which determines a free memory size of the printer based on the information sent from the printer, that the printer driver selecting section makes a comparison based on a size of the image data, the free memory size of the printer and the data transfer speed to select one of the printer drivers based on the result of the comparison, and that the printer environment measuring section comprises a printer free memory size measuring section which measures a free memory size of the printer for storing therein the image data and notifies it as the information to the printer free memory size determining section of the computer.

It may be arranged that the computer environment determining section comprises a computer drawing capability determining section which determines a drawing speed of the computer upon drawing the image data, and the printer environment determining section comprises a printer drawing capability determining section which determines a drawing speed of the printer based on the information sent from the printer, that the printer driver selecting section compares the drawing speed of the computer and the drawing speed of the printer to select one of the printer drivers based on the result of the comparison, and that the printer environment measuring section comprises a printer drawing speed measuring section which measures a drawing speed of the printer upon drawing the image data and notifies it as the information to the printer drawing capability determining section of the computer.

It may be arranged that the computer environment determining section comprises an intermediate metafile analyzing section which derives an evaluation size of an intermediate metafile of the image data, and the printer environment determining section comprises a printer free memory size determining section which determines a free memory size of the printer based on the information sent from the printer, that the printer driver selecting section compares the evaluation size of the intermediate metafile and the free memory size of the printer to select one of the printer drivers based on the result of the comparison, and that the printer environment measuring section comprises a printer free memory size measuring section which measures a free memory size of the printer for storing therein the image data and notifies it as the information to the printer free memory size determining section of the computer.

It may be arranged that the number of the printer drivers is two, that according to one of the printer drivers, the printing system is controlled such that one-page image data is sent from the computer to the printer, then the printer implements bit-mapping of the received image data for printing, and that according to the other printer driver, the printing system is controlled such that bit-mapped image data is sent from the computer to the printer which implements printing in parallel with receiving the bit-mapped image data from the computer.

BRIEF DESCRIPTION OF THE DRAWINGS

The present invention will be understood more fully from the detailed description given hereinbelow, taken in conjunction with the accompanying drawings.

In the drawings:

FIGS. 10, 12 and 13 are flow diagrams representing an operation sequence of the printing system shown in FIG. 9;

FIG. 11 is a diagram for explaining a drawing capability determining method according to the third preferred embodiment of the present invention;

FIGS. 15, 16 and 18 are flow diagrams representing an operation sequence of the printing system shown in FIG. 14; and FIG. 17 is a diagram for explaining a method of calculating an evaluation size of an intermediate metafile according to the fourth preferred embodiment of the present invention.

DESCRIPTION OF THE PREFERRED EMBODIMENTS

Now, preferred embodiments of the present invention will be described hereinbelow with reference to the accompanying drawings.

<First Embodiment>

Figure 1:
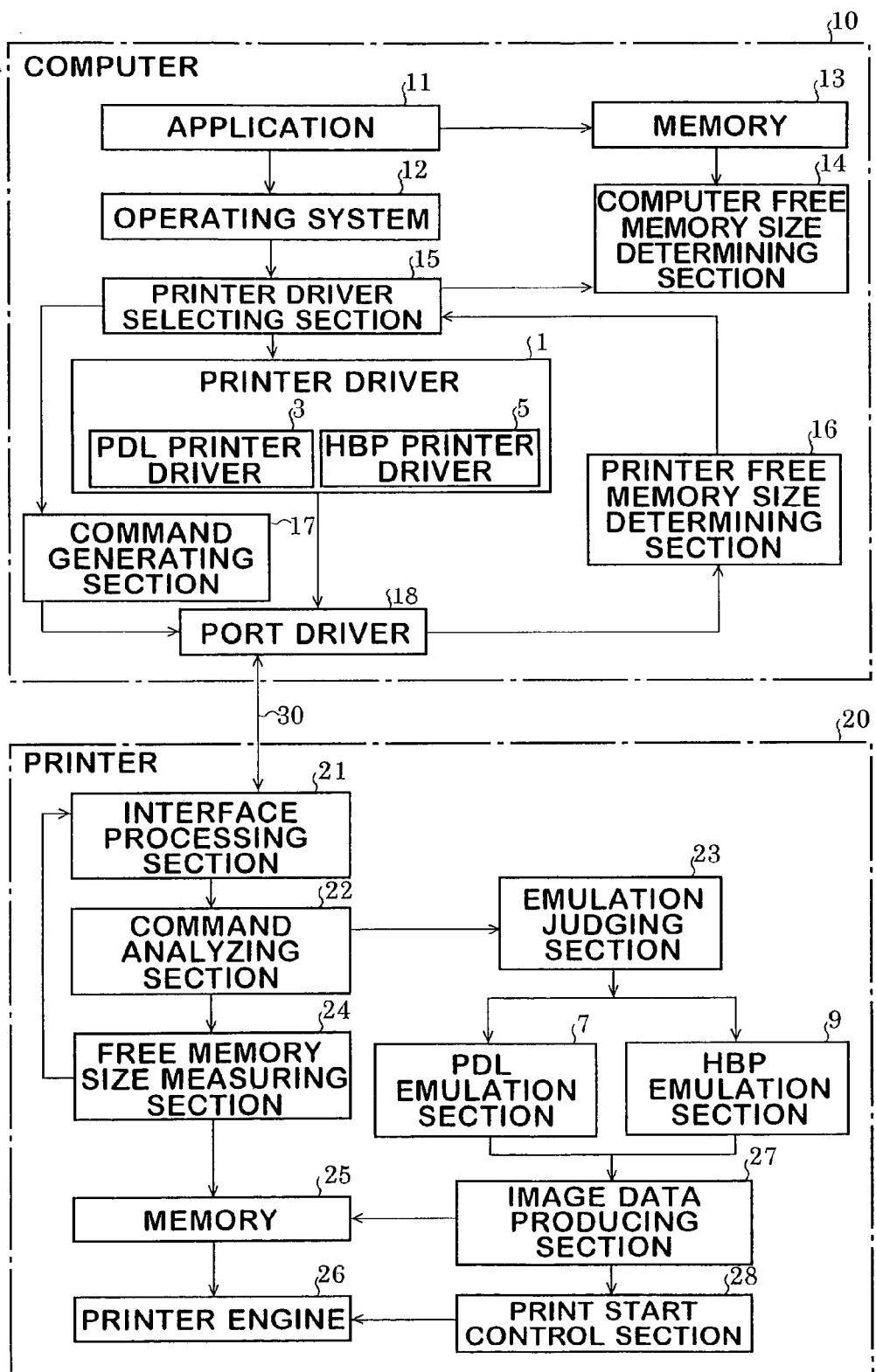
FIG. 1 is a block diagram showing a printing system according to a first preferred embodiment of the present invention.

FIG. 1 is a block diagram showing a printing system according to the first preferred embodiment of the present invention.

In FIG. 1, image data for printing is sent from a computer 10 to a printer 20 via a bidirectional interface 30, so that the printer 20 implements printing of the received image data.

The computer 10 includes an application 11, an operating system 12, a memory 13, a computer free memory size determining section 14, a printer driver selecting section 15, a printer free memory size determining section 16, a command generating section 17 and a port driver 18. The computer 10 further includes printer drivers 1, i.e. a PDL printer driver 3 and an HBP printer driver 5 in this embodiment.

The printer 20 includes an interface processing section 21, a command analyzing section 22, an emulation judging section 23, a printer free memory size measuring section 24, a memory 25, a printer engine 26, an image data producing section 27 and a print start control section 28. The printer 20 further includes a PDL emulation section 7 and an HBP emulation section 9. In this embodiment, the printer 20 is an LED type electrophotographic printer having the print resolution of, for example, 600 [dpi] (dot per inch) in each of the main and secondary scanning directions.

The bidirectional interface 30 is a well-known interface such as IEEE1284.

In FIG. 1, functions of the sections 14 to 17 are realized by an operation control program executed in the computer 10, while functions of the sections 7, 9, 22 to 24, 27 and 28 are realized by an operation control program executed in the printer 20.

In the computer 10, the application 11 is a program executed on the operating system 12 for producing image data. The image data may include character data and graphic data. The memory 13 is a storage area for storing therein image data upon request for printing. The computer free memory size determining section 14 determines a free memory size of the memory 13 upon storing image data thereinto. The free memory size represents the capacity of nonused storage areas in the memory 13.

In this embodiment, two kinds of the printer drivers, i.e. the PDL printer driver 3 and the HBP printer driver 5, are provided in the computer 10, while the number thereof may be more than two.

According to the PDL printer driver 3, the printing system is controlled such that one-page image data is transferred from the computer 10 to the printer 20, then the printer 20 implements bit-mapping of the received image data for printing. On the other hand, according to the HBP printer driver 5, the printing system is controlled such that bit-mapped image data is transferred from the computer 10 to the printer 20 which implements printing in parallel with receiving the bit-mapped image data from the computer 10.

The printer driver selecting section 15 compares a size of image data and free memory sizes of the computer 10 and the printer 20 to select one of the PDL printer driver 3 and the HBP printer driver 5 based on a selection rule preset corresponding to a result of the comparison and sets the selected printer driver for execution. The printer free memory size determining section 16 determines the free memory size of the printer 20 when it is notified from the printer 20, and feeds it to the printer driver selecting section 15. The command generating section 17 produces a command which is used by the printer driver selecting section 15 to acquire information of the free memory size from the printer 20, and other commands for other uses. The port driver 18 controls communication with the printer 20 via the bidirectional interface 30.

In the printer 20, the interface processing section 21 controls communication with the computer 10 via the bidirectional interface 30. The command analyzing section 22 analyzes the contents of a command received from the computer 10 and outputs a control signal to a corresponding section. The free memory size measuring section 24 measures the free memory size of the memory 25 for storing image data therein and notifies it to the printer free memory size determining section 16 of the computer 10. The emulation judging section 23 judges the kind of the emulation, i.e. the kind of the printer driver, selected by the computer 10. One of the PDL emulation section 7 and the HBP emulation section 9 is selected based on a result of the judgment made by the emulation judging section 23 for processing image data according to the selected emulation. The image data producing section 27 performs a drawing process to produce print image data and stores the print image data into the memory 25. The print start control section 28 controls the printer engine 26 to implement printing of the print image data stored in the memory 25.

[Operation]

In this embodiment, the size of image data and the free memory sizes of the computer 10 and the printer 20 are compared with each other and, based on a selection rule preset corresponding to the comparison result, one of the printer drivers 3 and 5 is selected.

Figure 2:
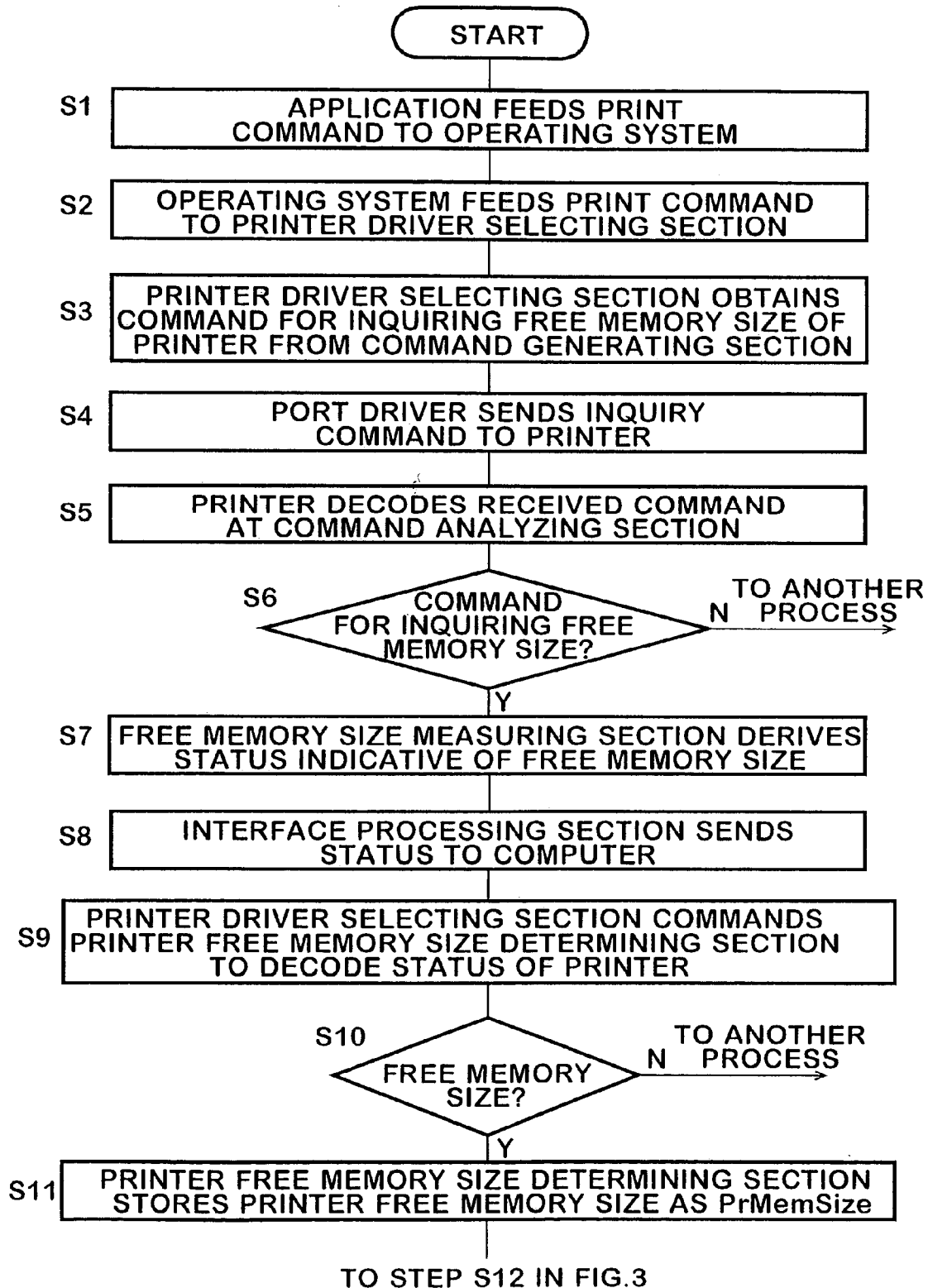
FIGS. 2, 3 and 4 are flow diagrams representing an operation sequence of the printing system shown in FIG. 1.
Figure 3:
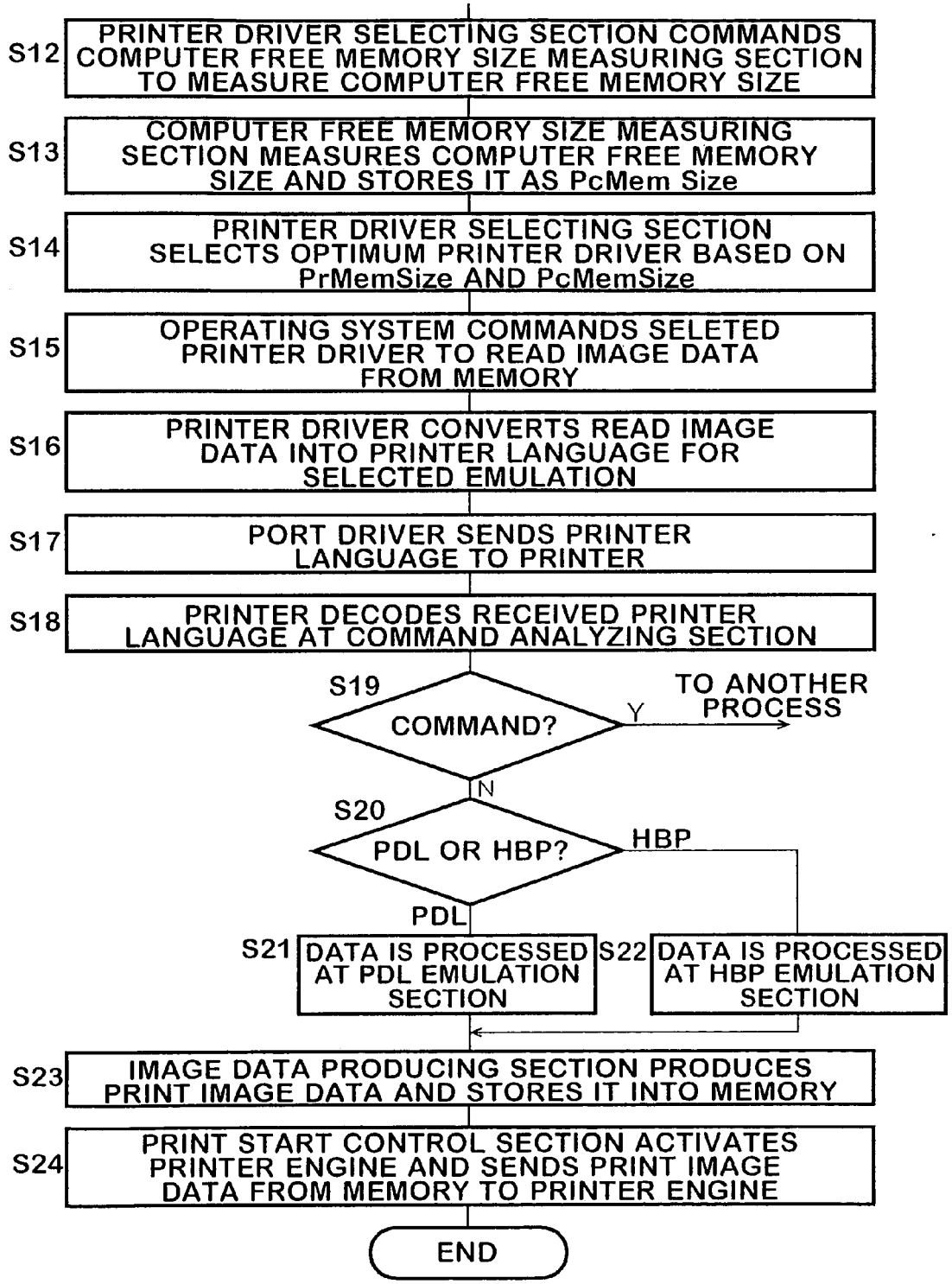
Figure 4:
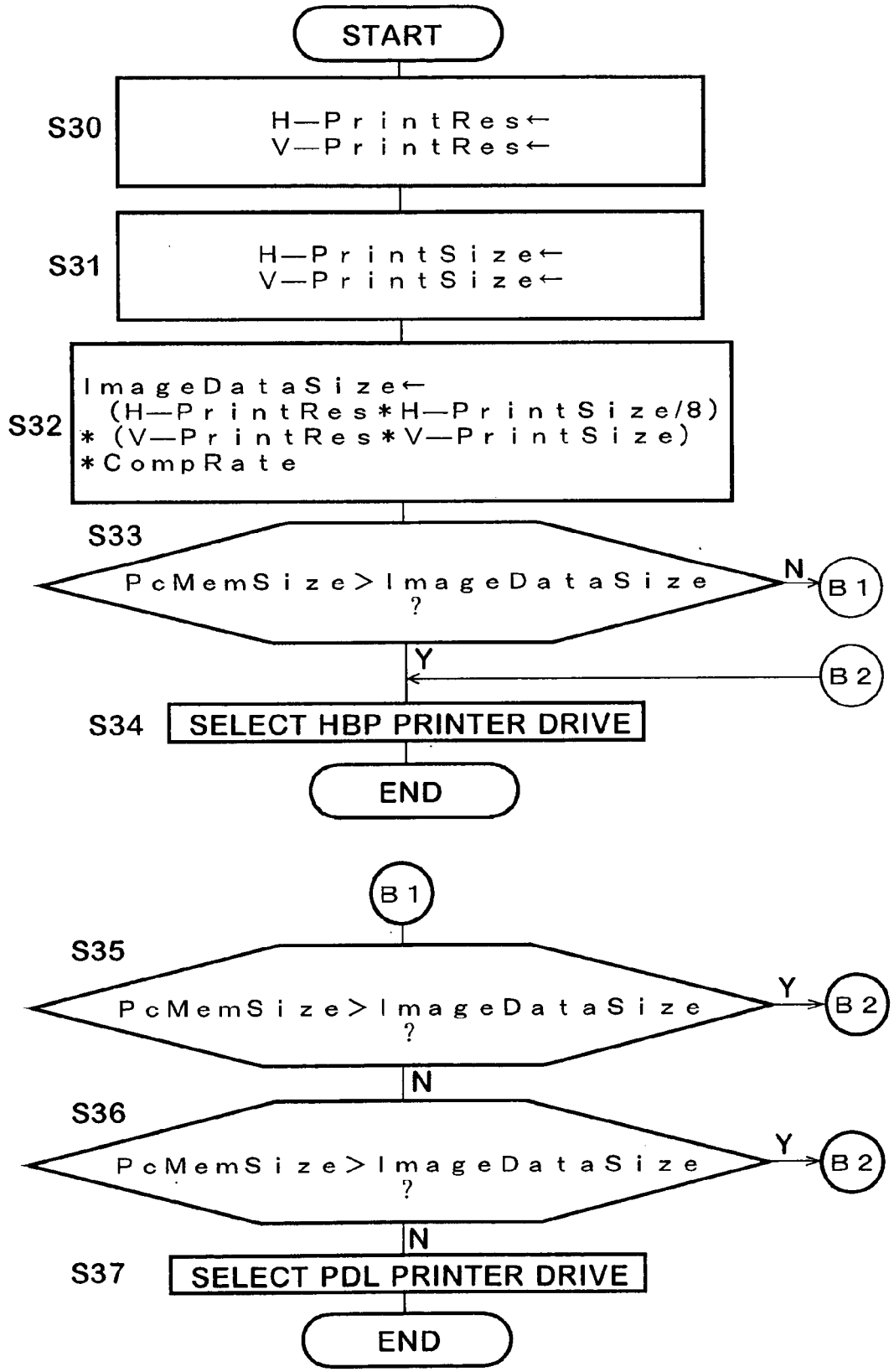

FIGS. 2, 3 and 4 are flow diagrams showing an operation sequence of the printing system according to the first preferred embodiment.

With reference to FIGS. 2 and 3, selection of the printer driver in the computer 10 and an operation sequence of the printer 20 will be described hereinbelow.

(Step S1)

For printing, a user inputs a print command which is fed to the operating system 12 of the computer 10 via the application 11 being executed on the operating system 12.

(Step S2)

The operating system 12 feeds the print command to the printer driver selecting section 15.

(Step S3)

The printer driver selecting section 15 obtains from the command generating section 17 a command for inquiring a free memory size of the printer 20, and commands the port driver 18 to send the inquiry command to the printer 20.

(Step S4)

The port driver 18 sends the inquiry command to the printer 20 via the bidirectional interface 30.

(Step S5)

The printer 20 receives the inquiry command at the interface processing section 21 and decodes it at the command analyzing section 22.

(Step S6)

The command analyzing section 22 judges whether the received command is for inquiring the free memory size of the memory 25.

(Step S7)

If positive at step S6, the free memory size measuring section 24 produces a status signal indicative of the free memory size of the printer 20 and feeds it to the interface processing section 21.

(Step S8)

The interface processing section 21 sends the status signal received from the free memory size measuring section 24 to the computer 10 via the bidirectional interface 30.

(Step S9)

The printer driver selecting section 15 commands the printer free memory size determining section 16 to decode the status signal received via the port driver 18.

(Step S10)

If the contents of the status signal represent the free memory size of the printer 20, the operation sequence proceeds to step S11. On the other hand, if negative, the operation sequence proceeds to execution of another process (not shown) corresponding to the contents of the status signal.

(Step S11)

The printer free memory size determining section 16 stores the printer free memory size as PrMemSize and notifies it to the printer driver selecting section 15.

(Step S12)

The printer driver selecting section 15 commands the computer free memory size determining section 14 to measure the free memory size of the memory 13 and notify it to the printer driver selecting section 15.

(Step S13)

The computer free memory size determining section 14 stores the measured free memory size as PcMemSize and notifies it to the printer driver selecting section 15.

(Step S14)

The printer driver selecting section 15 selects one of the PDL printer driver 3 and the HBP printer driver 5 based on the free memory size PrMemSize of the printer 20 and the free memory size PcMemSize of the computer 10 and sets it for execution.

(Step S15)

The operating system 12 commands the selected printer driver to read image data produced by the application 11 and stored in the memory 13.

(Step S16)

The selected printer driver converts the image data read from the memory 13 into a printer language for the corresponding emulation.

(Step S17)

The port driver 18 transfers the image data in the printer language to the printer 20.

(Step S18)

The printer 20 decodes at the command analyzing section 22 the image data received by the interface processing section 21 via the bidirectional interface 30.

(Step S19)

The command analyzing section 22 judges whether the received data is a command. If positive, the printer 20 carries out another process (not shown) corresponding to the command.

(Step S20)

If the received data is not a command, the emulation judging section 23 judges whether the received data is converted for the PDL emulation or the HBP emulation.

(Step S21)

If the received data is for the PDL emulation, the emulation judging section 23 feeds the image data to the PDL emulation section 7 where the image data is processed for the PDL emulation.

(Step S22)

If the received data is for the HBP emulation, the emulation judging section 23 feeds the image data to the HBP emulation section 9 where the image data is processed for the HBP emulation.

(Step S23)

The image data producing section 27 receives the image data processed at the PDL emulation section 7 or the HBP emulation section 9 to produce print image data from the received image data and writes it into the memory 25.

(Step S24)

The print start control section 28 activates the printer engine 26 and transfers the print image data from the memory 25 to the printer engine 26 where printing of the print image data is implemented.

Now, the printer driver selection sequence executed at step S14 in FIG. 3 will be described in detail with reference to FIG. 4.

(Step S30)

The printer driver selecting section 15 obtains the horizontal print resolution H_PrintRes[dpi] (dot per inch) and the vertical print resolution V_PrintRes[dpi] designated by the application 11.

(Step S31)

The printer driver selecting section 15 obtains the horizontal print paper size H_PrintSize[inch] and the vertical print paper size V_PrintSize[inch] designated by the application 11.

(Step S32)

When the image data is compressed at the compression rate CompRate (the rate of a data size after compression relative to the original data size), the printer driver selecting section 15 calculates an image data size ImageDataSize [byte] necessary for printing based on the horizontal print resolution H_PrintRes[dpi], the vertical print resolution V_PrintRes[dpi], the horizontal print paper size H_PrintSize [inch] and the vertical print paper size V_PrintSize[inch], using the following equation.

$$ImageDataSize = (H\_PrintRes \cdot H\_PrintSize/8) \cdot (V\_PrintRes \cdot V\_PrintSize) \cdot CompRate$$

For example, as described before, the printer 20 has the print resolution of 600 [dpi] in each of the main and secondary scanning directions. Thus, assuming that the print paper size is that of U.S. letter paper and the compression rate CompRate is 0.7, the image data size is given by the following equation.

$$ImageDataSize = (600 \text{ [dpi]} \cdot 8 \text{ [inch]}/8 \text{ [bit]}) \cdot (600 \text{ [dpi]} \cdot 10.67 \text{ [inch]}) \cdot 0.7 \approx 2625 \text{ [Kbyte]}$$

(Step S33)

The printer driver selecting section 15 compares the free memory size PcMemSize of the computer 10 and the image data size ImageDataSize.

(Step S34)

If PcMemSize is greater than ImageDataSize, one-page image data can be stored in the memory 13 of the computer 10 so that the printer driver selecting section 15 selects the HBP emulation, i.e. the HBP printer driver 5.

(Step S35)

If PcMemSize is not greater than ImageDataSize, the printer driver selecting section 15 compares the free memory size PrMemSize of the printer 20 and ImageDataSize.

If PrMemSize is greater than ImageDataSize, one-page image data can be stored in the memory 25 of the printer 20 so that the operation sequence proceeds to step S34 where the printer driver selecting section 15 selects the HBP emulation, i.e. the HBP printer driver 5.

(Step S36)

If PrMemSize is not greater than ImageDataSize, the printer driver selecting section 15 compares PcMemSize and PrMemSize.

If PcMemSize is greater than PrMemSize, the operation sequence proceeds to step S34 where the printer driver selecting section 15 selects the HBP emulation, i.e. the HBP printer driver 5.

(Step S37)

If PcMemSize is not greater than PrMemSize, the printer driver selecting section 15 selects the PDL emulation, i.e. the PDL printer driver 3.

The computer 10 may be a personal computer, a workstation, a word processor or one of other devices that can send image data to a printer and control the printer to print the received image data. The printer 20 may be one of various types that can be operated by two or more kinds of printer drivers, wherein a proper selection rule is provided for each of the printer drivers as in the foregoing first preferred embodiment.

[Effect]

In the foregoing first preferred embodiment, the image data size and the free memory sizes of the computer and the printer are compared, i.e. the environments of the computer and the printer are compared, and one of the two printer drivers is selected based on the selection rule provided corresponding to the comparison result. Thus, the optimum printer driver can be automatically selected depending on the environments of the computer and the printer.

<Second Embodiment>

Figure 5:
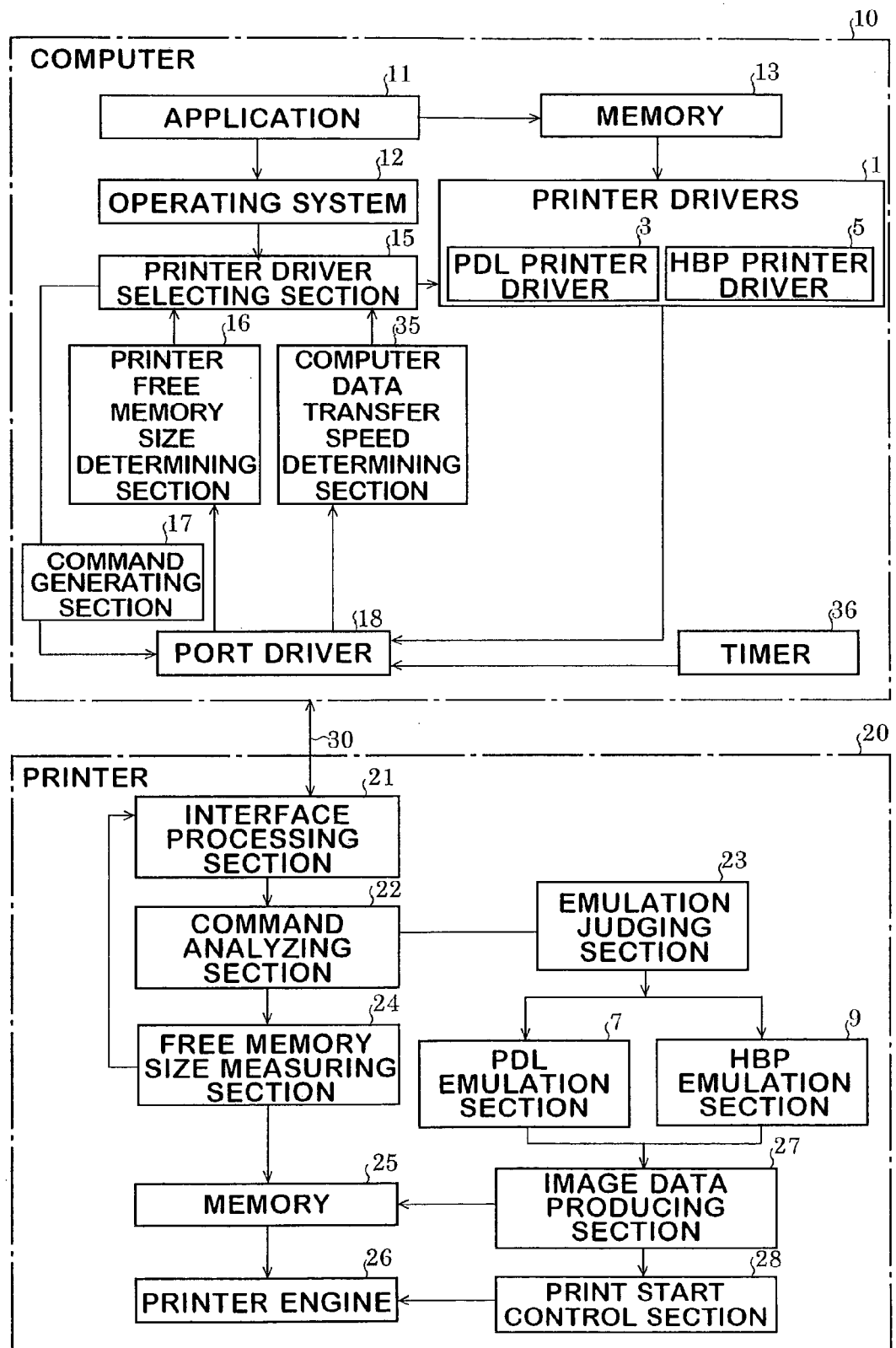
FIG. 5 is a block diagram showing a printing system according to a second preferred embodiment of the present invention.

FIG. 5 is a block diagram showing a printing system according to the second preferred embodiment of the present invention.

In this embodiment, a printer 20 is an LED type electrophotographic printer having, for example, the print resolution of 600 [dpi] in each of the main and secondary scanning directions and a paper feed speed of 2 [ips] (inch per second) in the vertical direction.

In FIG. 5, a computer 10 differs from the computer 10 in FIG. 1 in that a computer data transfer speed determining section 35 and a timer 36 are added, while the computer free memory size determining section 14 is omitted. The printer 20 in FIG. 5 is the same as the printer 20 in FIG. 1. Hereinbelow, what differs from the foregoing first preferred embodiment will be described.

The computer data transfer speed determining section 35 uses the port driver 18 and the timer 36 to measure a data transfer speed when image data is transferred from the computer 10 to the printer 20. In this embodiment, the printer driver selecting section 15 compares between the computer data transfer speed and the printer paper feed speed and between the image data size and the printer free memory size to select one of the PDL printer driver 3 and the HBP printer driver 5 based on a selection rule preset corresponding to a result of the comparison and sets the selected printer driver for execution.

[Operation]

Figure 6:
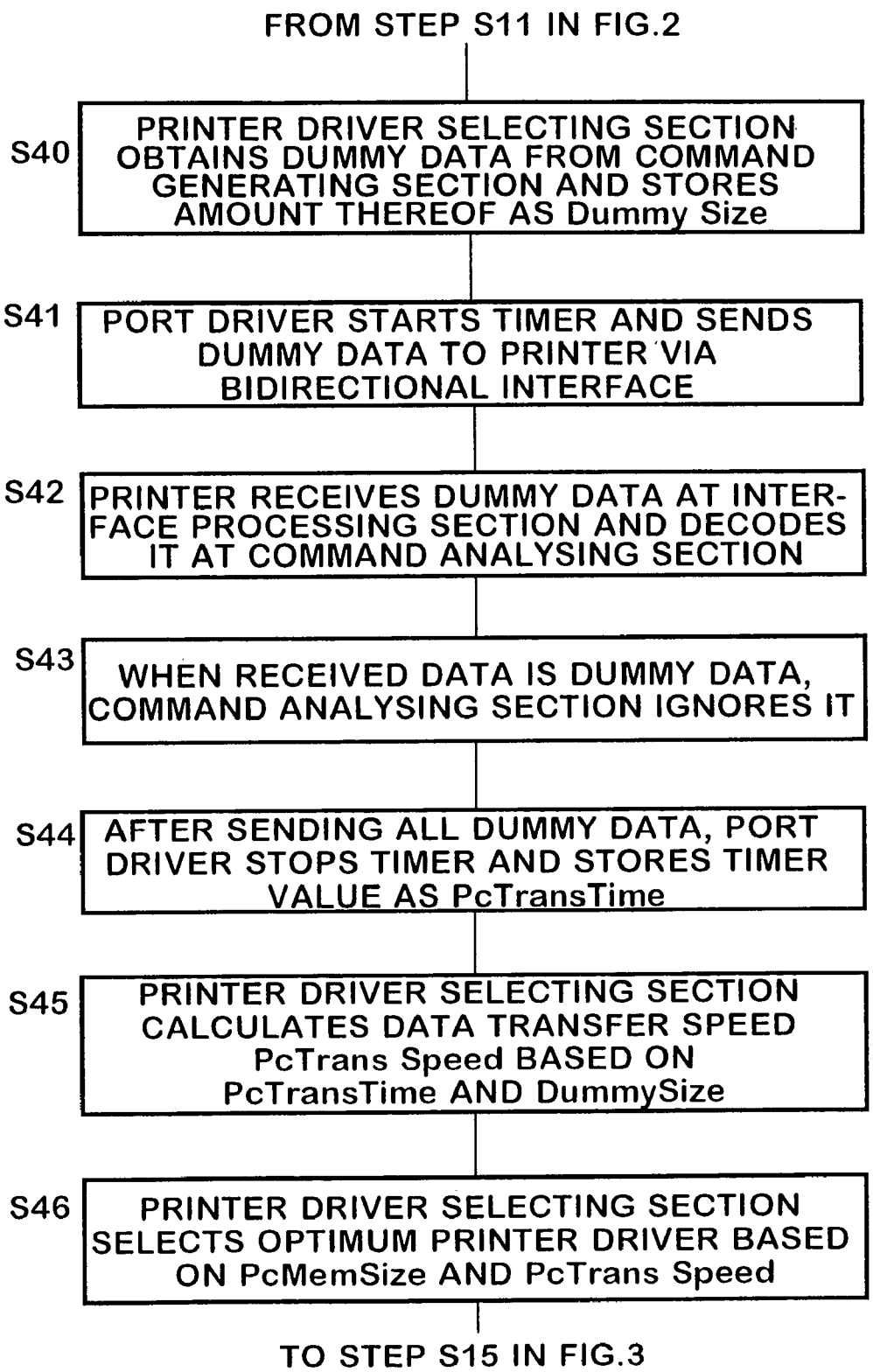
FIGS. 6, 7 and 8 are flow diagrams representing an operation sequence of the printing system shown in FIG. 5.
Figure 7:
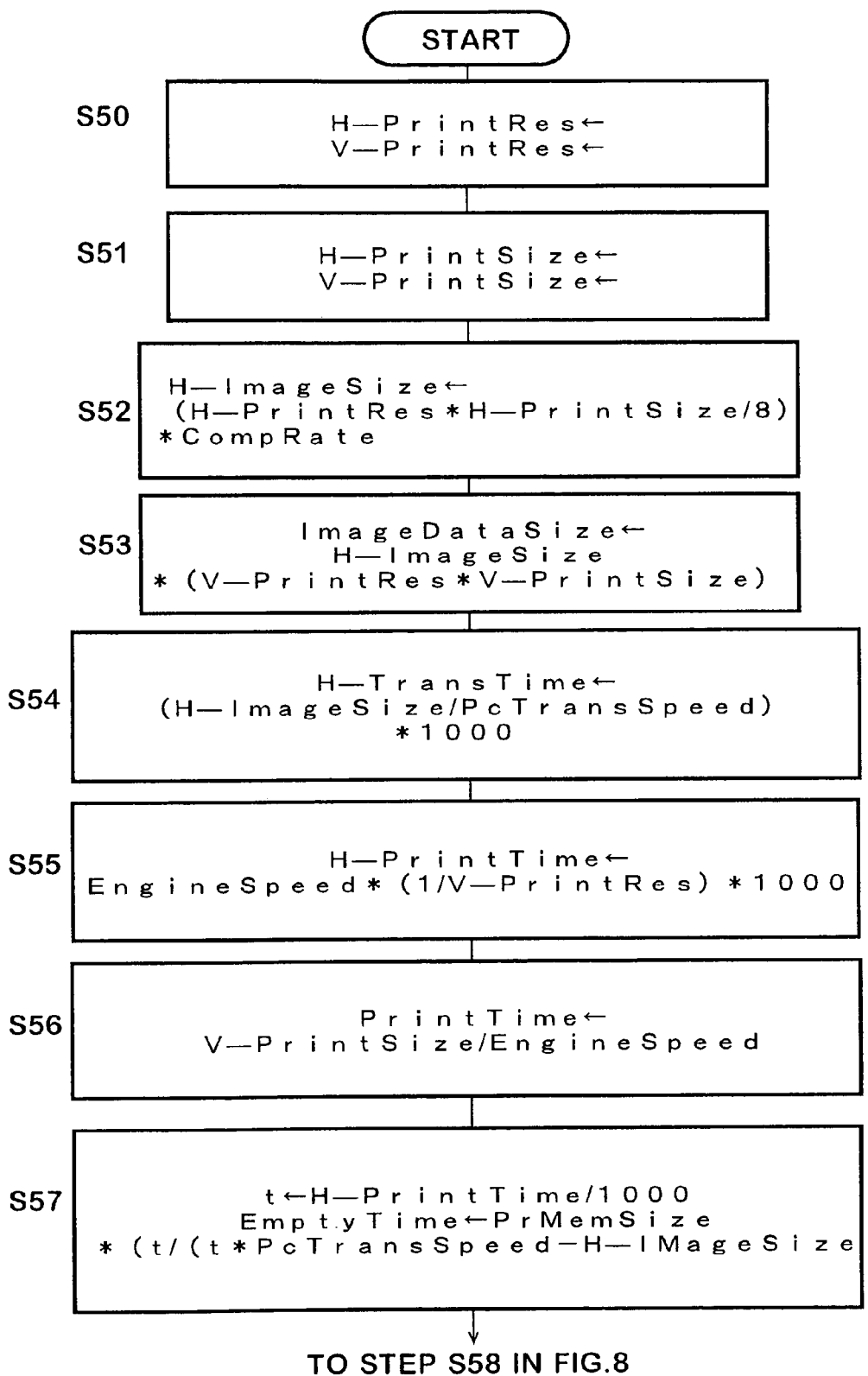
Figure 8:
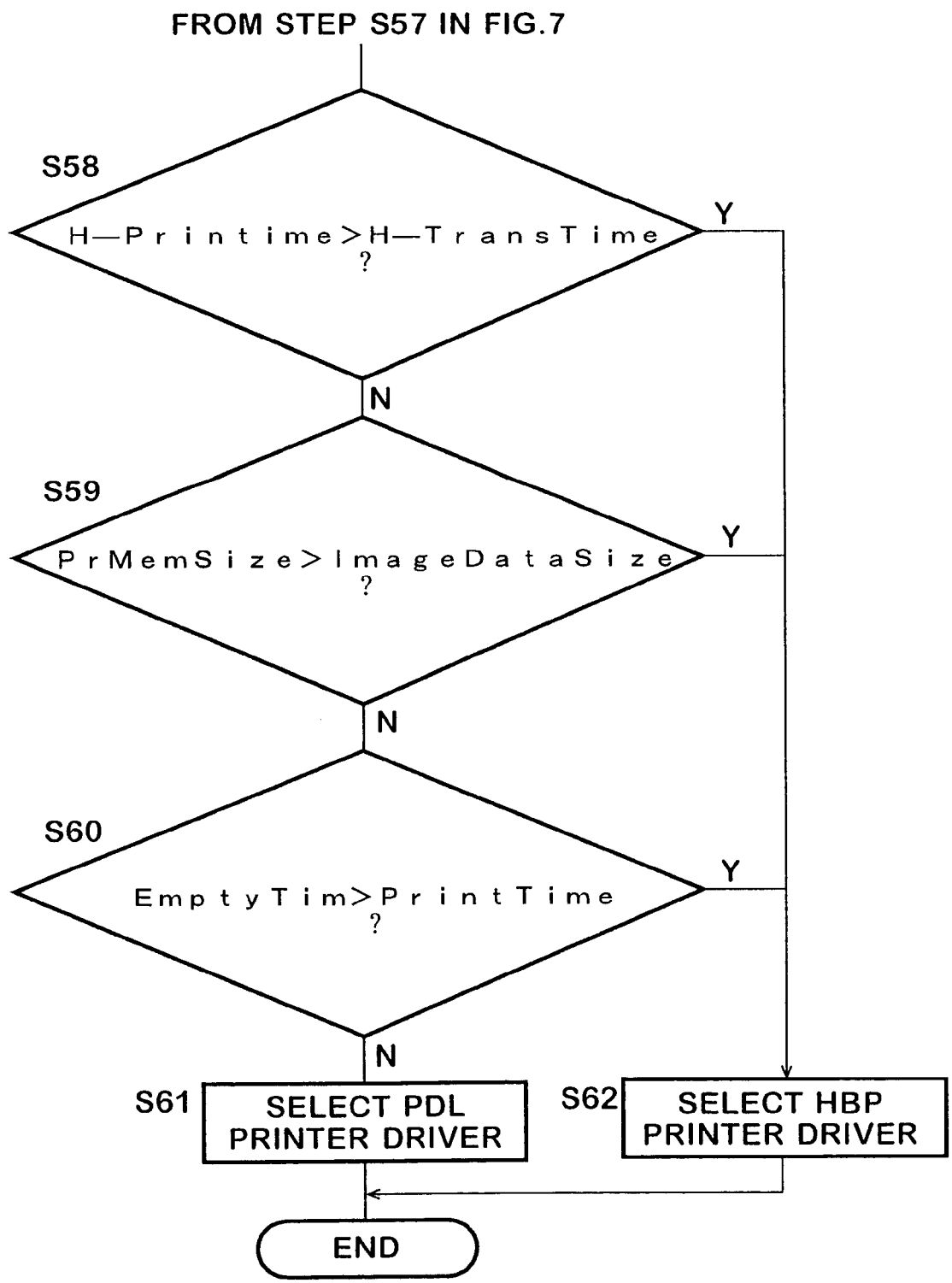

FIGS. 6, 7 and 8 are flow diagrams showing an operation sequence of the printing system according to the second preferred embodiment.

With reference to FIG. 6, selection of the printer driver in the computer 10 and an operation sequence of the printer 20 will be described hereinbelow.

In this embodiment, the printing system first executes steps S1 to S11 shown in FIG. 2 as in the foregoing first preferred embodiment. The following operation sequence is implemented subsequently to the execution of step S11.

(Step S40)

For calculating a data transfer speed of the bidirectional interface 30, the printer driver selecting section 15 obtains dummy data which is meaningless to the printer 20, from the command generating section 17, and commands the port driver 18 to send the dummy data to the printer 20. The printer driver selecting section 15 sets a size of the dummy data as DummySize[byte].

(Step S41)

The port driver 18 starts the timer 36 and sends the dummy data to the printer 20 via the bidirectional interface 30.

(Step S42)

The printer 20 receives the dummy data at the interface processing section 21 and decodes it at the command analyzing section 22.

(Step S43)

The command analyzing section 22 judges whether the received data is the dummy data, and ignores it when it is the dummy data.

(Step S44)

After sending all the dummy data, the port driver 18 stops the timer 36 and sets a timer value as PcTransTime[μs].

(Step S45)

The printer driver selecting section 15 calculates a data transfer speed PcTransSpeed[byte/sec] based on the dummy data size DummySize[byte] and the timer value PcTransTime[μs].

(Step S46)

The printer driver selecting section 15 selects one of the PDL printer driver 3 and the HBP printer driver 5 based on the printer free memory size PrMemSize and the data transfer speed PcTransSpeed, and sets it for execution.

Since a subsequent operation sequence is the same as that of steps S15 to S24 shown in FIG. 3, explanation thereof is omitted.

Now, the printer driver selection sequence executed at step S46 in FIG. 6 will be described in detail with reference to FIGS. 7 and 8.

(Step S50)

The printer driver selecting section 15 obtains the horizontal print resolution H_PrintRes[dpi] and the vertical print resolution V_PrintRes[dpi] designated by the application 11.

(Step S51)

The printer driver selecting section 15 obtains the horizontal print paper size H_PrintSize[inch] and the vertical print paper size V_PrintSize[inch] designated by the application 11.

(Step S52)

The printer driver selecting section 15 calculates a horizontal image data size H_ImageSize[byte] based on the compression rate CompRate (the rate of a data size after compression relative to the original data size), the horizontal print resolution H_PrintRes[dpi] and the horizontal print paper size H_PrintSize[inch], using the following equation.

$$H\_ImageSize = (H\_PrintRes \cdot H\_PrintSize/8) \cdot CompRate$$

(Step S53)

The printer driver selecting section 15 calculates an image data size ImageDataSize[byte] necessary for printing based on the horizontal image data size H_ImageSize[byte], the vertical print resolution V_PrintRes[dpi] and the vertical print paper size V_PrintSize[inch], using the following equation.

$$\text{ImageDataSize} = H\_\text{ImageSize} \cdot (V\_\text{PrintRes} \cdot V\_\text{PrintSize})$$

(Step S54)

The printer driver selecting section 15 calculates an image data transfer time per raster line H_TransTime[ms] based on the data transfer speed PcTransSpeed[byte/sec] and the horizontal image data size H_ImageSize[byte], using the following equation.

$$H\_\text{TransTime} = (H\_\text{ImageSize}/\text{PcTransSpeed}) \cdot 1000$$

(Step S55)

The printer driver selecting section 15 calculates a paper feed time per raster line H_PrintTime[ms] based on a paper feed speed EngineSpeed[ips] and the vertical print resolution V_PrintRes[dpi], using the following equation.

$$H\_\text{PrintTime} = \text{EngineSpeed} \cdot (1/V\_\text{PrintRes}) \cdot 1000$$

(Step S56)

The printer driver selecting section 15 calculates a paper feed time per page PrintTime[sec] based on the paper feed speed EngineSpeed[ips] and the vertical print paper size V_PrintSize[inch], using the following equation.

$$\text{PrintTime} = V\_\text{PrintSize}/\text{EngineSpeed}$$

(Step S57)

Assuming that the printer 20 starts printing from the state wherein image data corresponding to a portion of one-page image data is stored up to the free memory size of the printer 20 and that the printer 20 simultaneously receives remaining image data (image data corresponding to a remaining portion of the one-page image data), an image data size S[byte] stored in the memory 25 of the printer 20 after a lapse of time t[sec] is calculated based on the printer free memory size PrMemSize[byte], the horizontal image data size H_ImageSize[byte] and the paper feed time per raster line H_PrintTime[ms], using the following equation.

$$S = \text{PrMemSize} - (H\_\text{PrintTime} \cdot \text{PcTransSpeed} - H\_\text{ImageSize}) \cdot t/H\_\text{PrintTime}$$

Here, a time EmptyTime[sec] representing a time until areas of the memory 25 storing the image data become empty is given by a value of t when S=0. Accordingly, the printer driver selecting section 15 calculates the time EmptyTime[sec] based on the following equation.

$$\text{EmptyTime} = \text{PrMemSize} \cdot (H\_\text{PrintTime}/1000)/(H\_\text{PrintTime}/1000 \cdot \text{PcTransSpeed} - H\_\text{ImageSize})$$

(Step S58)

The printer driver selecting section 15 compares the pager feed time per raster line H_PrintTime[ms] and the image data transfer time per raster line H_TransTime[ms].

If H_PrintTime is greater than H_TransTime, meaning that image data can be sent to the printer 20 without causing an underrun error during printing, the operation sequence proceeds to step S62 where the printer driver selecting section 15 selects the HBP emulation, i.e. the HBP printer driver 5.

(Step S59)

If H_PrintTime is not greater than H_TransTime, the printer driver selecting section 15 compares the free memory size PrMemSize of the printer 20 and the mage data size ImageDataSize.

If PrMemSize is greater than ImageDataSize, meaning that one-page image data can be stored in the memory 25 of the printer 20, the operation sequence proceeds to step S62 where the printer driver selecting section 15 selects the HBP emulation, i.e. the HBP printer driver 5.

(Step S60)

If PrMemSize is not greater than ImageDataSize, the printer driver selecting section 15 compares the time EmptyTime[sec] and the paper feed time per page PrintTime[sec].

If EmptyTime is greater than PrintTime, meaning that reception of one-page image data is finished during PrintTime, the operation sequence proceeds to step S62 where the printer driver selecting section 15 selects the HBP emulation, i.e. the HBP printer driver 5.

(Step S61)

If EmptyTime is not greater than PrintTime, the printer driver selecting section 15 selects the PDL emulation, i.e. the PDL printer driver 3.

For example, it is assumed that the paper feed speed EngineSpeed is 2 [ips], the horizontal print resolution H_PrintRes and the vertical print resolution V_PrintRes are each 600 [dpi], the horizontal print paper size H_PrintSize is 8 [inch], the vertical print paper size V_PrintSize is 10.67 [inch], the compression rate CompRate is 0.7, the printer free memory size PrMemSize is 1024[Kbyte], the dummy data size DummySize is 128 [Kbyte] and the timer value (data transfer time) PcTransTime is 0.5 [sec].

Since CompRate=0.7, the horizontal image data size H_ImageSize[byte] is given by $$H\_\text{ImageSize} = (H\_\text{PrintRes} \cdot H\_\text{PrintSize}/8) \cdot \text{CompRate}$$
$$= (600[\text{dpi}] \cdot 8[\text{inch}]/8[\text{bit}]) \cdot 0.7$$
$$= 420[\text{byte}]$$

The image data size ImageDataSize[byte] is given by $$\text{ImageDataSize} = H\_\text{ImageSize} \cdot (V\_\text{PrintRes} \cdot V\_\text{PrintSize})$$
$$= 420[\text{byte}] \cdot (600[\text{dpi}] \cdot 10.67[\text{inch}])$$
$$= 2{,}688{,}840[\text{byte}]$$

Since DummySize=128·1024 [byte] and PcTransTime=0.5[sec], the data transfer speed PcTransSpeed is given by $$\text{PcTransSpeed} = \text{DummySize}/\text{PcTransTime}$$
$$= 128 \cdot 1024[\text{byte}]/0.5[\text{sec}]$$
$$= 262{,}144[\text{byte/sec}]$$

The mage data transfer time per raster line H_TransTime [ms] is given by $$H\_TransTime = (H\_ImageSize / PcTransSpeed) \cdot 1000$$
$$= 420[byte] / 262{,}144[byte/sec]) \cdot 1000$$
$$\approx 1.60[ms]$$

The paper feed time per raster line H_PrintTime[ms] is given by $$H\_PrintTime = EngineSpeed \cdot (1 / V\_PrintRes) \cdot 1000$$
$$= 2 \cdot (1 / 600) \cdot 1000$$
$$\approx 3.33[ms]$$

The paper feed time per page PrintTime[sec] is given by $$PrintTime = V\_PrintSize / EngineSpeed$$
$$= 10.67 / 2$$
$$= 5.335[sec]$$

The time EmptyTime[sec] is given by $$EmptyTime = PrMemSize \cdot (H\_PrintTime / 1000) / (H\_PrintTime / 1000 \cdot PcTransSpeed - H\_ImageSize)$$
$$= 1024 \cdot 1024 \cdot (3.33 / 1000) / (3.33 / 1000 \cdot 262144 - 420)$$
$$\approx 7.65[sec]$$

Accordingly, in this example, since EmptyTime=7.65 [sec] and PrintTime=5.335 [sec], EmptyTime is greater than PrintTime so that the printer driver selecting section 15 selects the HBP emulation, i.e. the HBP printer driver 5.

[Effect]

In the foregoing second preferred embodiment, the comparison is made between the computer data transfer speed and the printer paper feed speed and between the image data size and the printer free memory size, i.e. the comparison is made between the environments of the computer and the printer, and one of the two printer drivers is selected based on the selection rule provided corresponding to the comparison result. Thus, the optimum printer driver can be automatically selected depending on the environments of the computer and the printer.

<Third Embodiment>

Figure 9:
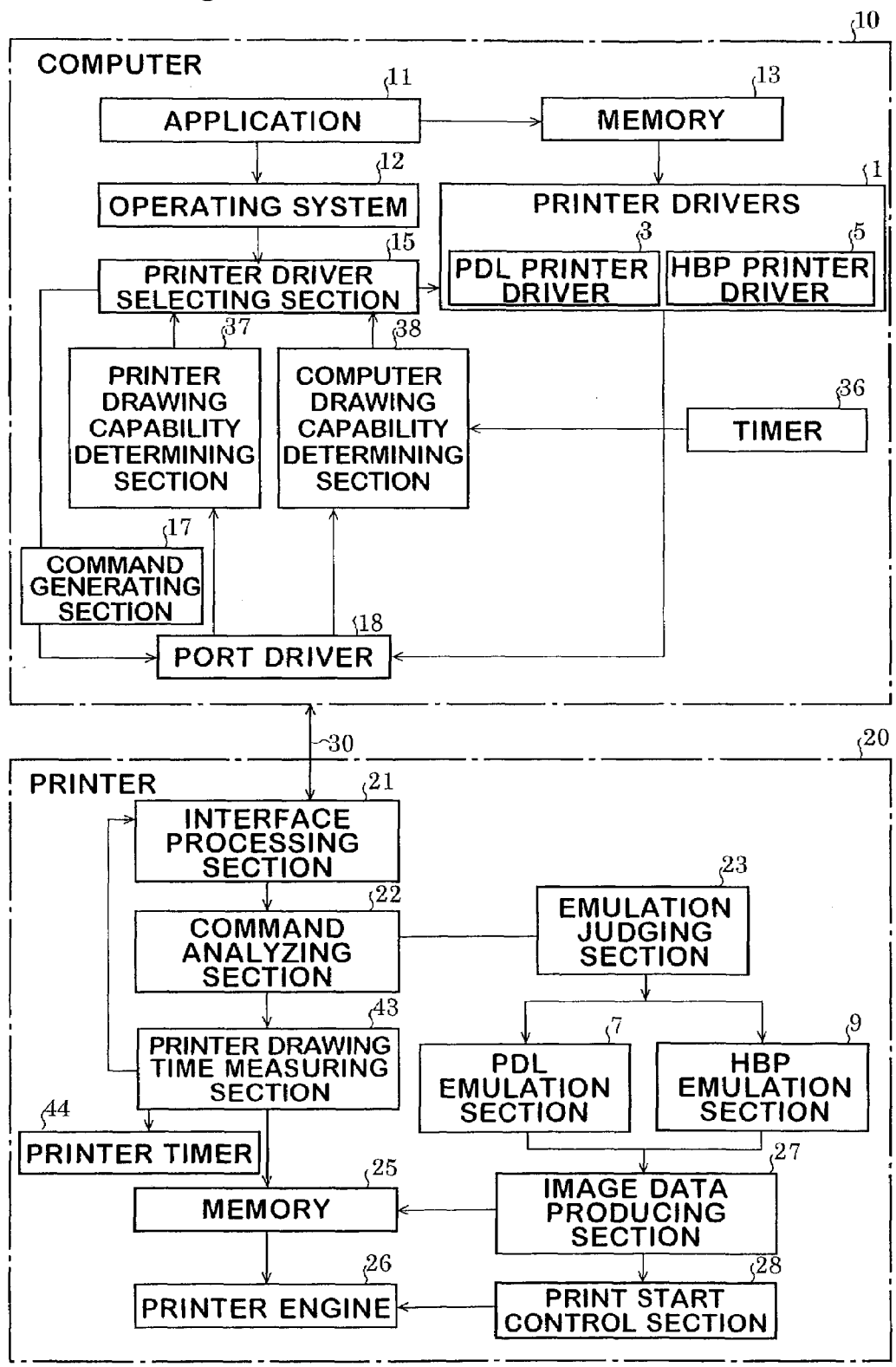
FIG. 9 is a block diagram showing a printing system according to a third preferred embodiment of the present invention.

FIG. 9 is a block diagram showing a printing system according to the third preferred embodiment of the present invention.

In FIG. 9, a computer 10 differs from the computer 10 in FIG. 5 in that a printer drawing capability determining section 37 and a computer drawing capability determining section 38 are added while the printer free memory size determining section 16 and the computer data transfer speed determining section 35 shown in FIG. 5 are omitted. A printer 20 in FIG. 9 differs from the printer 20 in FIG. 5 in that a printer drawing time measuring section 43 and a printer timer 44 are added while the free memory size measuring section 24 shown in FIG. 5 is omitted. Hereinbelow, what differs from the foregoing second preferred embodiment will be described.

The computer drawing capability determining section 38 uses a timer 36 to determine a drawing speed of the computer 10 upon drawing image data. The printer drawing capability determining section 37 determines a drawing speed of the printer 20 based on a status signal sent from the printer 20. In this embodiment, the printer driver selecting section 15 compares the drawing speed of the computer 10 and the drawing speed of the printer 20 to select one of the PDL printer driver 3 and the HBP printer driver 5 based on a selection rule preset corresponding to a result of the comparison and sets the selected printer driver for execution. The printer drawing time measuring section 43 uses the printer timer 44 to measure a drawing time of the printer 20 upon drawing image data and notifies it to the printer drawing capability determining section 37 of the computer 10.

[Operation]

Figure 10:
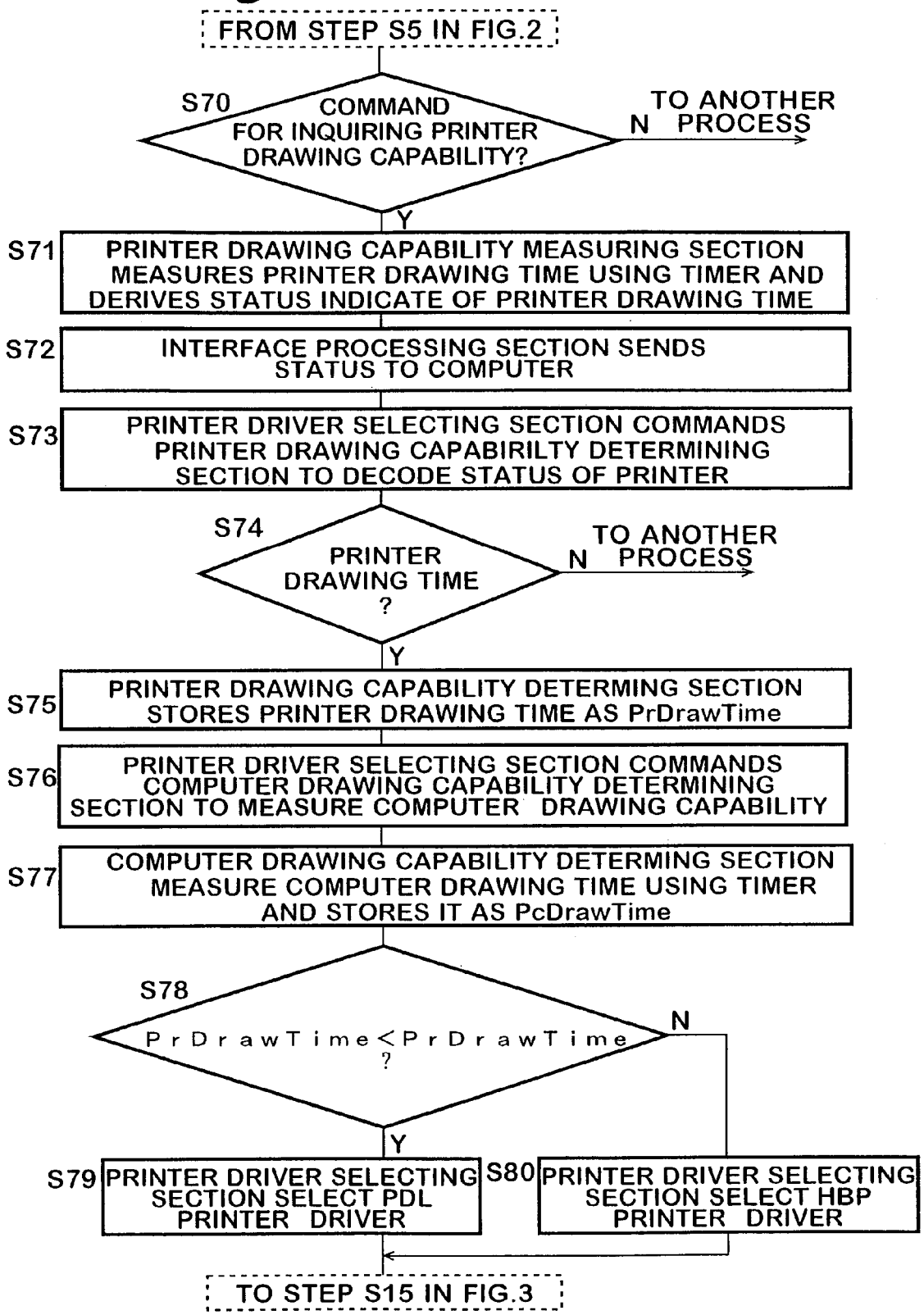
Figure 13:
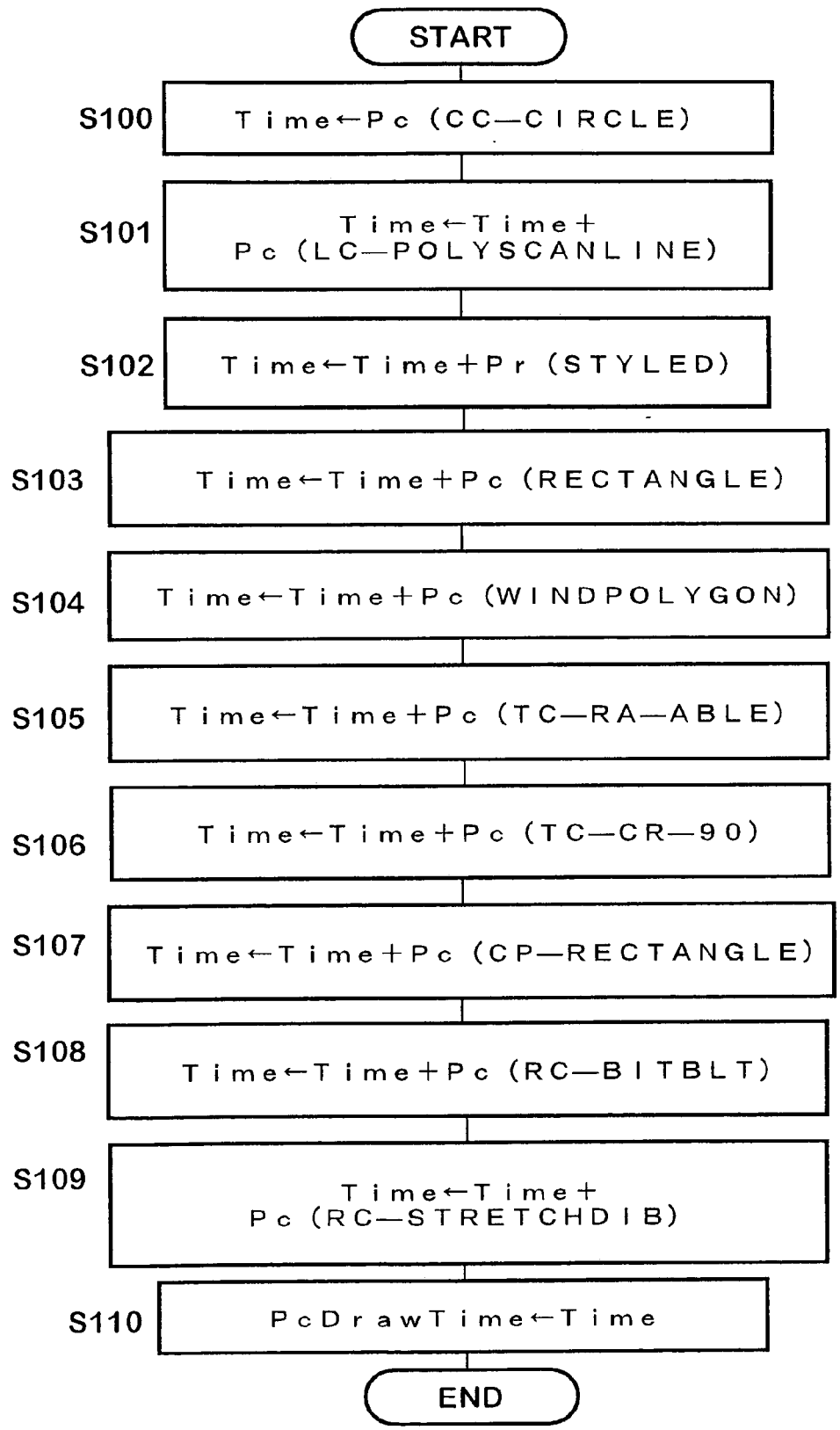

FIGS. 10, 12 and 13 are flow diagrams showing an operation sequence of the printing system according to the third preferred embodiment.

With reference to FIG. 10, selection of the printer driver in the computer 10 and an operation sequence of the printer 20 will be described hereinbelow.

In this embodiment, the printing system first executes steps S1 to S5 shown in FIG. 2 except that at step S3 the printer driver selecting section 15 obtains from the command generating section 17 a command for inquiring the drawing capability of the printer 20 instead of the free memory size thereof. The following operation sequence is implemented subsequently to the execution of step S5.

(Step S70)

The printer 20 judges at the command analyzing section 22 whether the command received from the computer 10 is for inquiring the drawing capability of the printer 20.

(Step S71)

If positive at step S70, the printer drawing time measuring section 43 performs a drawing process, measures a drawing time using the printer timer 44 and produces a status signal indicative of the drawing time.

On the other hand, if negative at step S70, the operation sequence proceeds to execution of another process (not shown) according to the contents of the command.

(Step S72)

The interface processing section 21 sends the status signal received from the printer drawing time measuring section 43 to the computer 10 via the bidirectional interface 30.

(Step S73)

The printer driver selecting section 15 commands the printer drawing capability determining section 37 to decode the status signal received via the port driver 18.

(Step S74)

The printer drawing capability determining section 37 judges whether the contents of the status signal represent a drawing time of the printer 20. If negative, the operation sequence proceeds to execution of another process (not shown) corresponding to the contents of the status signal.

(Step S75)

If the contents of the status signal represent the printer drawing time, the printer drawing capability determining section 37 stores it as PrDrawTime[sec] and notifies it to the printer driver selecting section 15.

(Step S76)

The printer driver selecting section 15 commands the computer drawing capability determining section 38 to measure the drawing capability of the computer 10.

(Step S77)

The computer drawing capability determining section 38 measures a computer drawing time using the timer 36, stores it as PcDrawTime[sec] and notifies it to the printer driver selecting section 15.

(Step S78)

The printer driver selecting section 15 compares the printer drawing time PrDrawTime and the computer drawing time PcDrawTime.

(Step S79)

If PrDrawTime is smaller than PcDrawTime, the printer driver selecting section 15 judges that the drawing capability of the printer 20 excels that of the computer 10, and selects the PDL printer driver 3.

(Step S80)

If PrDrawTime is not smaller than PcDrawTime, the printer driver selecting section 15 judges that the drawing capability of the computer 10 excels that of the printer 20, and selects the HBP printer driver 5.

Since a subsequent operation sequence is the same as that of steps S15 to S24 shown in FIG. 3, explanation thereof is omitted.

FIG. 11 is a diagram for explaining a drawing capability determining method.

Concrete examples for evaluating the drawing capabilities of the computer 10 and the printer 20 will be given with respect to the operating system MS-Windows produced by Microsoft Corporation.

The image drawing capabilities defined by GDI (graphic device interface) of MS-Windows are classified into six categories as shown in FIG. 11.

By selecting typical ten drawing functions from the six categories as objects for evaluation and evaluating the sum of drawing times thereof, the total image drawing capability can be measured.

Referring now to FIG. 12, an operation sequence of the printer drawing time measuring section 43 of the printer 20 will be described.

According to the operation sequence shown in FIG. 12, the printer drawing time PrDrawTime stored at step S75 in FIG. 10 can be calculated by the following equation.

$$PrDrawTime = Pr(CC\_CIRCLE) + Pr(LC\_POLYSCANLINE) +$$
$$Pr(LC\_STYLED) + Pr(PC\_RECTANGLE) +$$
$$Pr(PC\_WINDPOLYGON) + Pr(TC\_RA\_ABLE) +$$
$$Pr(TC\_CR\_90) + Pr(CP\_RECTANGLE) +$$
$$Pr(RC\_BITBLT) + Pr(RC\_STRETCHDIB)$$

In the equation, Pr( ) functions represent processing times of the respective drawing functions of the printer 20 shown in FIG. 11.

Specifically, steps S90 to S99 in FIG. 12 correspond to drawing capability calculations at items (1) to (10) shown in FIG. 11.

At step S90, a time for drawing a circle representing the curve drawing capability is measured and set as Time.

At step S91, a drawing time for a scanline representing the line drawing capability is measured and added to Time.

At step S92, a drawing time for a styled line representing the line drawing capability is measured and added to Time.

At step S93, a drawing time for a rectangle representing the polygon drawing capability is measured and added to Time.

At step S94, a drawing time for the whole-area paint-out of a polygon representing the polygon drawing capability is measured and added to Time.

At step S95, a drawing time for a raster font representing the text drawing capability is measured and added to Time.

At step S96, a drawing time for character rotation by 90 degrees representing the text drawing capability is measured and added to Time.

At step S97, a drawing time for clipping a rectangle representing the clipping drawing capability is measured and added to Time.

At step S98, a drawing time for bit-map transfer representing the raster drawing capability is measured and added to Time.

At step S99, a drawing time for stretching/contraction of DIB bit-map representing the raster drawing capability is measured and added to Time.

After execution of step S99, Time is set as PrDrawTime.

Referring now to FIG. 13, an operation sequence of the computer drawing capability determining section 38 of the computer 10 will be described.

According to the operation sequence shown in FIG. 13, the computer drawing time PcDrawTime stored at step S77 in FIG. 10 can be calculated by the following equation.

$$PcDrawTime = Pc(CC\_CIRCLE) + Pc(LC\_POLYSCANLINE) +$$
$$Pc(LC\_STYLED) + Pc(PC\_RECTANGLE) +$$
$$Pc(PC\_WINDPOLYGON) + Pc(TC\_RA\_ABLE) +$$
$$Pc(TC\_CR\_90) + Pc(CP\_RECTANGLE) +$$
$$Pc(RC\_BITBLT) + Pc(RC\_STRETCHDIB)$$

In the equation, Pc( ) functions represent processing times of the respective drawing functions of the computer 10 shown in FIG. 11.

As appreciated, steps S100 to S109 in FIG. 13 correspond to drawing capability calculations at items (1) to (10) shown in FIG. 11 and are the same as steps S90 to S99 in FIG. 12.

After execution of step S109, Time is set as PcDrawTime at step S110.

[Effect]

In the foregoing third preferred embodiment, the drawing capability of the computer and the drawing capability of the printer are compared, i.e. the environments of the computer and the printer are compared, and one of the two printer drivers is selected based on the selection rule provided corresponding to the comparison result. Thus, the optimum printer driver can be automatically selected depending on the environments of the computer and the printer.

<Fourth Embodiment>

Figure 14:
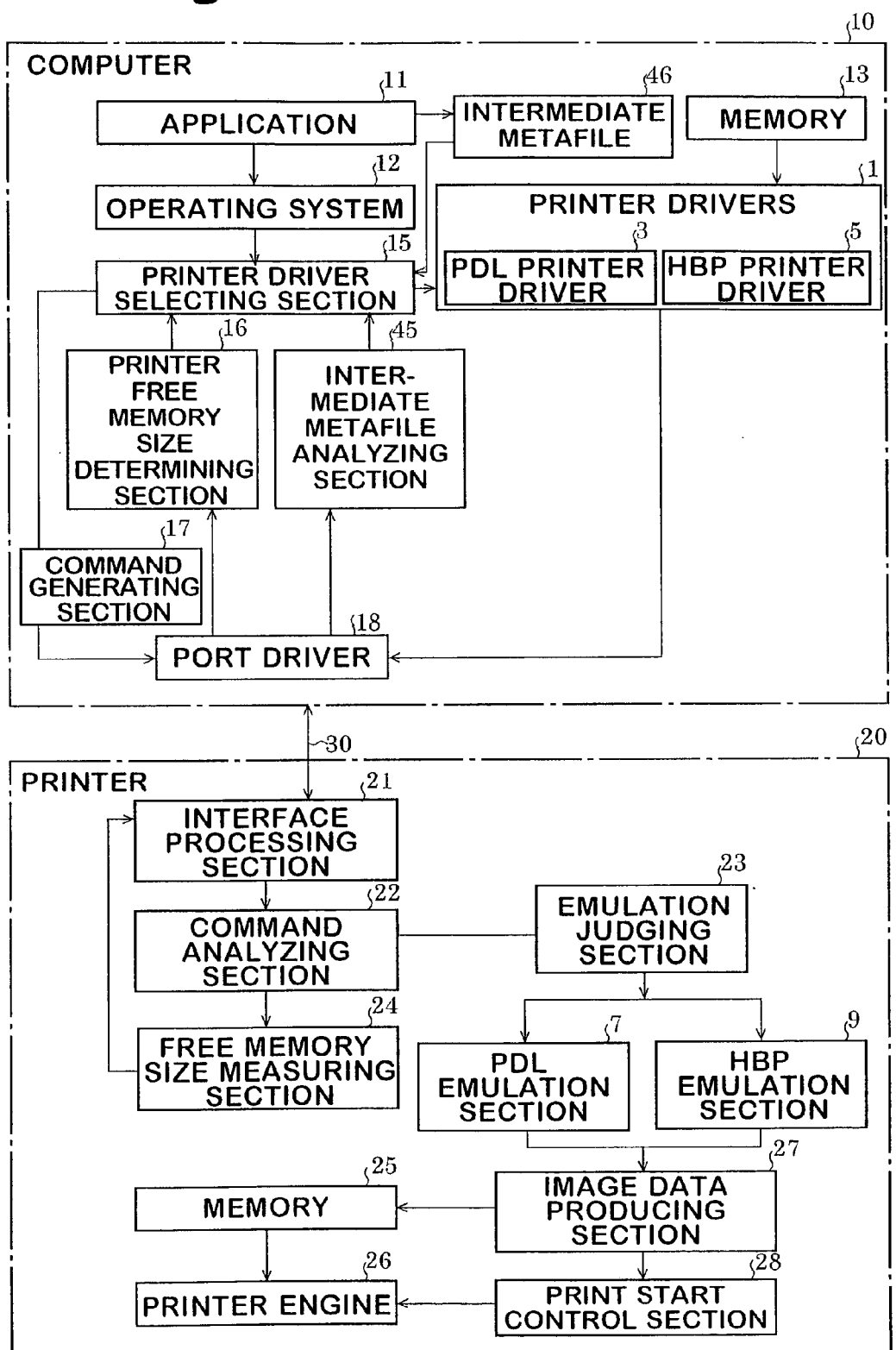
FIG. 14 is a block diagram showing a printing system according to a fourth preferred embodiment of the present invention.

FIG. 14 is a block diagram showing a printing system according to the fourth preferred embodiment of the present invention.

In this embodiment, a printer 20 is an LED type electro-photographic printer having, for example, the print resolution of 600 [dpi] in each of the main and secondary scanning directions and a paper feed speed of 2 [ips] in the vertical direction.

In FIG. 14, a computer 10 differs from the computer 10 in FIG. 5 in that an intermediate metafile analyzing section 45 and an intermediate metafile 46 are added while the computer data transfer speed determining section 35 and the timer 36 shown in FIG. 5 are omitted. A printer 20 in FIG. 14 is the same as the printer 20 in FIG. 5. Hereinbelow, what differs from the foregoing second preferred embodiment will be described.

In this embodiment, upon requesting printing of image data, the application 11 produces a print command and the intermediate metafile 46 of the image data. The intermediate metafile analyzing section 45 derives an evaluation size of the intermediate metafile 46. The printer driver selecting section 15 compares the free memory size of the printer 20 and the evaluation size of the intermediate metafile 46 to select one of the PDL printer driver 3 and the HBP printer driver 5 based on a selection rule preset corresponding to a result of the comparison and sets the selected printer driver for execution.

[Operation]

Figure 15:
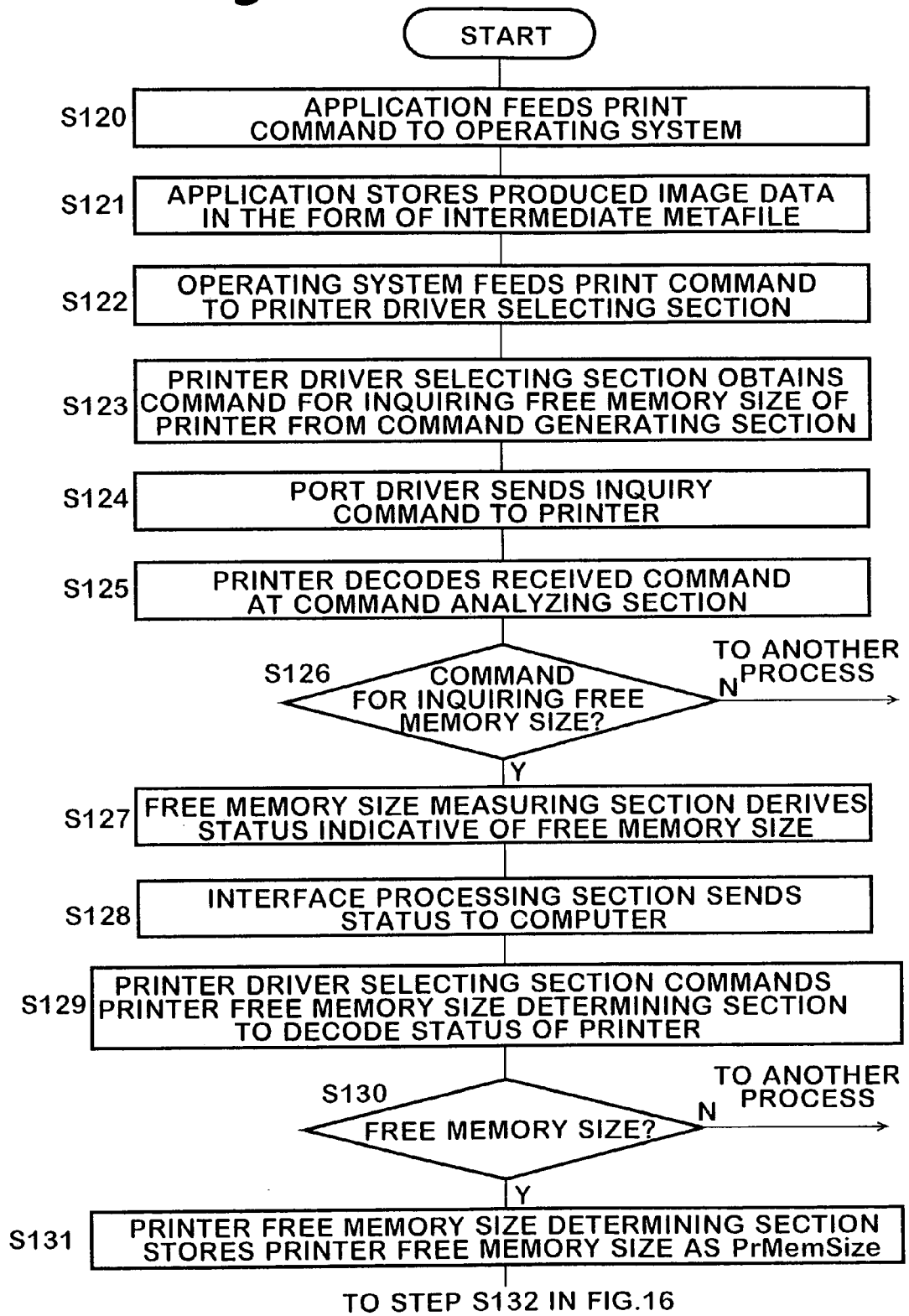

FIGS. 15, 16 and 18 are flow diagrams showing an operation sequence of the printing system according to the fourth preferred embodiment.

With reference to FIGS. 15 and 16, selection of the printer driver in the computer 10 and an operation sequence of the printer 20 will be described hereinbelow.

(Step S120)

For printing, a user inputs a print command which is fed to the operating system 12 of the computer 10 via the application 11 being executed on the operating system 12.

(Step S121)

The application 11 stores produced image data in the form of the intermediate metafile 46.

(Step S122)

The operating system 12 feeds the print command to the printer driver selecting section 15.

(Step S123)

The printer driver selecting section 15 obtains from the command generating section 17 a command for inquiring a free memory size of the printer 20, and commands the port driver 18 to send the inquiry command to the printer 20.

(Step S124)

The port driver 18 sends the inquiry command to the printer 20 via the bidirectional interface 30.

(Step S125)

The printer 20 receives the inquiry command at the interface processing section 21 and decodes it at the command analyzing section 22.

(Step S126)

The command analyzing section 22 judges whether the received command is for inquiring the free memory size of the memory 25.

(Step S127)

If positive at step S126, the free memory size measuring section 24 derives a status signal indicative of the free memory size of the printer 20 and feeds it to the interface processing section 21.

(Step S128)

The interface processing section 21 sends the status signal received from the free memory size measuring section 24 to the computer 10 via the bidirectional interface 30.

(Step S129)

The printer driver selecting section 15 commands the printer free memory size determining section 16 to decode the status signal received via the port driver 18.

(Step S130)

The printer free memory size determining section 16 judges whether the contents of the status signal represent the free memory size of the printer 20. If negative, the operation sequence proceeds to execution of another process (not shown) corresponding to the contents of the status signal.

(Step S131)

If the contents of the status signal represent the free memory size of the printer 20, the printer free memory size determining section 16 stores it as PrMemSize and notifies it to the printer driver selecting section 15.

Then, the operation sequence proceeds to step S132 in FIG. 16.

(Step S132)

The printer driver selecting section 15 commands the intermediate metafile analyzing section 45 to analyze the contents of the intermediate metafile 46 produced by the application 11.

(Step S133)

The intermediate metafile analyzing section 45 analyzes the contents of the image data stored in the intermediate metafile 46 to store a result of the analysis as intermediate metafile information PcMetaInfo and notifies it to the printer driver selecting section 15.

(Step S134)

The printer driver selecting section 15 compares the printer free memory size PrMemSize and the intermediate metafile information PcMetaInfo.

(Step S135)

If PrMemSize is greater than PcMetaInfo, the printer driver selecting section 15 judges that the printer 20 can implement printing normally without causing a page buffer overflow in response to receipt of PDL commands, and selects the PDL printer driver 3.

(Step S136)

If PrMemSize is not greater than PeMetaInfo, the printer driver selecting section 15 judges that the printer 20 may cause a page buffer overflow in response to receipt of PDL commands, and selects the HBP printer driver 5.

Since a subsequent operation sequence is the same as that of steps S15 to S24 shown in FIG. 3, explanation thereof is omitted.

At step S133 in FIG. 16, the intermediate metafile analyzing section 45 evaluates the contents of the intermediate metafile 46 using PDL commands, which will be described in detail with reference to FIGS. 17 and 18.

FIG. 17 is a diagram for explaining a metafile evaluation size calculation method, wherein image drawing functions stored in the intermediate metafile 46 are evaluated with respect to PDL commands of seven kinds. Based on evaluation sizes with respect to these PDL commands, the total evaluation size PcMetaInfo of the whole intermediate metafile 46 can be derived.

FIG. 18 shows an operation sequence for calculating the total evaluation size PcMetaInfo. In FIG. 18, a metafile evaluation size is initialized at step S140, then the contents of the intermediate metafile 46 are classified as shown in FIG. 17 so that steps S142 to S148 are executed in sequence to derive the total evaluation size PcMetaInfo. After adding the evaluation sizes with respect to all the PDL commands, the operation sequence is finished (Yes at step S149).

The total metafile evaluation size PcMetaInfo is calculated by the following equation.

$$PcMetaInfo = Count(TEXT) \cdot Size(TEXT) + Count(LINE) \cdot Size(LINE) +$$
$$Count(CIRCLE) \cdot Size(CIRCLE) + Count(CURVE) \cdot$$
$$Size(CURVE) + Count(PIXEL) \cdot Size(PIXEL) +$$
$$\Sigma(IMAGE) \cdot Size(IMAGE) + Count(DUMMY) \cdot$$
$$Size(DUMMY)$$

For example, it is assumed that the printer free memory size PrMemSize stored at step S1131 in FIG. 15 is 1024 [Kbyte] and that the contents of the intermediate metafile 46 are as follows.

Number of Times of Text Drawing=2400
Number of Times of Line Drawing=100
Number of Times of Circle Drawing=2
Number of Times of Curve Drawing=20
Number of Times of Pixel Drawing=4000
Number of Times of Image Data Drawing=10
Number of Times of Drawing Others=200

In this case, using the foregoing equation, the total metafile evaluation size PcMetaInfo is given by $$PcMetaInfo = 2400 \cdot 52 + 100 \cdot 14 + 2 \cdot 14 + 20 \cdot 18 + 4000 \cdot 6 +$$
$$10 \cdot 40 \cdot 1024 + 200 \cdot 40$$
$$= 124800 + 1400 + 28 + 360 + 24000 + 409600 + 8000$$
$$= 568188 \text{ [byte]}$$

From the foregoing result, PrMemSize is greater than PcMetaInfo so that the PDL printer driver is selected.

[Effect]

In the foregoing fourth preferred embodiment, the evaluation size of the intermediate metafile and the free memory size of the printer are compared, i.e. the environments of the computer and the printer are compared, and one of the two printer drivers is selected based on the selection rule provided corresponding to the comparison result. Thus, the optimum printer driver can be automatically selected depending on the environments of the computer and the printer.

While the present invention has been described in terms of the preferred embodiments, the invention is not to be limited thereto, but can be embodied in various ways without departing from the principle of the invention as defined in the appended claims.

What is claimed is:

1. A printing system comprising:
   (a) a computer and a printer, said computer including a plurality of printer drivers respectively corresponding to different emulations; and
   (b) a printer driver selecting section which performs a comparison on the basis of at least an image data size, a free memory size of said computer and a free memory size of said printer, and selects one of said plurality of printer drivers before using any printer drivers based on a result of said comparison, wherein
   (i) said computer processes image data by using the selected printer driver and sends the processed image data to said printer,
   (ii) said printer includes an emulation judging section which judges said emulation corresponding to the selected printer driver, and
   (iii) said printer receives the processed image data from said computer and processes the received data by using the judged emulation.

2. A printing system comprising:
   (a) a computer and A printer, said computer including a plurality of printer drivers respectively corresponding to different emulations;
   (b) a data transfer speed determining section which determines a data transfer speed when image data is transferred from said computer to said printer; and
   (c) a printer driver selecting section which selects one of said plurality of printer drivers before using any printer drivers on the basis of the size of said image data, a free memory size of said printer and said data transfer speed, wherein
   (i) said computer processes said image data by using the selected printer driver and sends the processed image data to said printer,
   (ii) said printer includes an emulation judging section which judges said emulation corresponding to the selected printer driver, and
   (iii) said printer receives the processed image data from said computer and processes the received data by using the judged emulation.

3. A printing system comprising:
   (a) a computer and a printer, said computer including a plurality of printer drivers respectively corresponding to different emulations;
   (b) a drawing capability determining means which determines a computer drawing capability and a printer drawing capability when image data is draw-processed respectively by said computer and said printer; and
   (c) a printer driver selecting section which selects one of said plurality of printer drivers before using any printer drivers on the basis of the determined computer drawing capability and the determined printer drawing capability, wherein
   (i) said computer processes said image data by using the selected printer driver and sends the processed image data to said printer,
   (ii) said printer includes an emulation judging section which judges said emulation corresponding to the selected printer driver, and
   (iii) said printer receives the processed image data from said computer, and processes the received data by using the judged emulation.

4. A printing system comprising:
   (a) a host apparatus; and
   (b) an image recording apparatus which receives image data from said host apparatus and performs a print, wherein said host apparatus includes:
   (i) a plurality of printer drivers respectively corresponding to different emulations,
   (ii) an image data generating section for generating image data,
   (iii) a memory for storing said image,
   (iv) a free memory size detecting section for detecting a free memory size of said memory, (v) a printer driver selecting section for obtaining said free memory size, for comparing the size of said image data, said free memory size and a free memory size of said image recording apparatus, and for selecting one from said plurality of printer drivers on the basis of a comparison result, and (vi) a control section for processing said image data by using said printer driver selected by said printer driver selecting section, and for sending said processed image data and the information of said selected printer driver, wherein said image recording apparatus includes:

(i) a receiving section for said image data and said information of said printer driver output from said host apparatus, said different emulations corresponding to said printer drivers, (ii) an emulation judging section for judging one of said emulations on the basis of said received information, and (iii) a control section for processing said received image data by using said judged emulation.

5. The printing system according to claim 4, wherein said printer drivers include a first printer driver which sends said image data from said host apparatus to said image recording apparatus by page description language form, and a second printer driver which sends said image data from said host apparatus to said image recording apparatus by bitmap form, 6. The printing system according to claim 5, wherein said emulations include a first emulation which processes said image data of said page description language form received from said host apparatus, and a second emulation which processes said image data of said bitmap form.

7. The printing system according to claim 5, wherein said printer driver selecting section selects said first printer driver when said free memory sizes of said host apparatus and said image recording apparatus all are smaller than said size of said image data.

8. The printing system according to claim 5, wherein said printer driver selecting section selects said second printer driver when said tree memory sizes of said host apparatus and said image recording apparatus all are larger than said size of said image data.

9. The printing system according to claim 4, wherein said printer driver selecting section selects said second printer driver when said image recording apparatus drawing ability is lower than said host apparatus drawing ability.

10. The printing system according to claim 4, wherein said host apparatus further includes:

(vii) an attainment instruction generating section for generating an obtainment instruction to obtain said free memory size of said image recording apparatus from said image recording apparatus, and said image recording apparatus further includes:

(iv) a memory for storing said received image data, (v) a free memory size detecting section for detecting a free memory size of said memory, and (vi) an instruction replying section for sending said detected free memory size to said host apparatus after received said obtainment instruction.

11. The printing system according to claim 4, wherein said host apparatus further includes:

(vii) a compressing section for compressing said image data, said printer driver selecting section performing a comparison with respect to said compressed image data, said free memory size of said host apparatus and said free memory size of said image recording apparatus.

12. A printing system comprising:

(a) a host apparatus; and (b) an image recording apparatus which receives image data from said host apparatus and performs a print, wherein said host apparatus includes:

(i) a plurality of printer drivers respectively corresponding to different emulations;

(ii) an image data generating section for generating image data, (iii) a data transmission speed judging section for judging a data transmission speed when said image data is transmitted to said image recording apparatus, (iv) a printer driver selecting section for selecting one from said plurality of printer drivers on the basis of said data transmission speed, the size of said image data and a free memory size of said image recording apparatus, and (v) a control section for processing said image data by using said printer driver selected by said printer driver selecting section, and for sending said processed image data and the information of said selected printer driver, wherein said image recording apparatus includes:

(i) a receiving section for said image data and said information of said printer driver output from said host apparatus, said different emulations corresponding to said printer drivers, (ii) an emulation judging section for judging one of said emulations on the basis of said received information, and (iii) a control section for processing said received image data by using said judged emulation.

13. The printing system according to claim 12, wherein said printer drivers include a first printer driver which sends said image data from said host apparatus to said image recording apparatus by page description language form, and a second printer driver which fiends said image data from said host apparatus to said image recording apparatus by bitmap form.

14. The printing system according to claim 12, wherein said host apparatus further includes a dummy data generating section to generate dummy data for measuring said data transmission speed, said data transmission speed judging section judging said data transmission speed on the basis of said dummy data.

15. A printing system comprising:

(a) a host apparatus; and (b) an image recording apparatus which receives image data from said host apparatus and performs a print, wherein said host apparatus includes:

(i) a plurality of printer drivers respectively corresponding to different emulations;

(ii) an image data generating section for generating image data, (iii) a drawing ability deciding section for deciding a host apparatus drawing ability when said image data is processed in said host apparatus, and an image recording apparatus drawing ability when said image data is processed in said image recording apparatus, (iv) a printer driver selecting section for selecting one from said plurality of printer driven; on the basis of said host apparatus drawing ability and said image recording apparatus drawing ability, and (v) a control section for processing said image data by using said printer driver selected by said printer driver selecting section, and for sending said processed image data and the information of said selected printer driver, wherein said image recording apparatus includes:
(i) a receiving section for said image data and said information of said printer driver output from said host apparatus, said different emulations corresponding to said printer drivers,
(ii) an emulation judging section for judging one of said emulations on the basis of said received information, and
(iii) a control section for processing said received image data by using said judged emulation.

16. The printing system according to claim 15, wherein said printer drivers include a first printer driver which sends said image data from said host apparatus to said image recording apparatus by page description language form, and a second printer driver which sends said image data from said host apparatus to said image recording apparatus by bitmap form.

17. The printing system according to claim 16, wherein said emulations include a first emulation which processes said image data of said page description language form received from said host apparatus, and a second emulation which processes said image data of said bitmap form.

18. The printing system according to claim 16, wherein said printer driver selecting section selects said first printer driver when said image recording apparatus drawing ability is higher than said host apparatus drawing ability.

* * * * *